(12) United States Patent
Miki et al.

(10) Patent No.: US 10,308,313 B2
(45) Date of Patent: Jun. 4, 2019

(54) BICYCLE OPERATING DEVICE

(71) Applicant: SHIMANO INC., Sakai (JP)

(72) Inventors: Yoshimitsu Miki, Sakai (JP); Shun Kakehashi, Sakai (JP); Naoki Fujimoto, Sakai (JP); Shohei Yonehama, Sakai (JP); Tsuyoshi Nakamura, Sakai (JP)

(73) Assignee: SHIMANO INC., Sakai (JP)

( * ) Notice: Subject to any disclaimer, the term of this patent is extended or adjusted under 35 U.S.C. 154(b) by 247 days.

(21) Appl. No.: 15/158,552

(22) Filed: May 18, 2016

(65) Prior Publication Data

US 2017/0334506 A1    Nov. 23, 2017

(51) Int. Cl.
| | | |
|---|---|---|
| B62L 3/02 | (2006.01) | |
| B62K 21/12 | (2006.01) | |
| B62K 23/02 | (2006.01) | |
| B62M 25/08 | (2006.01) | |
| B62K 23/06 | (2006.01) | |

(52) U.S. Cl.
CPC ........... B62L 3/023 (2013.01); B62K 21/12 (2013.01); B62K 23/02 (2013.01); B62K 23/06 (2013.01); B62M 25/08 (2013.01)

(58) Field of Classification Search
CPC .................................... B62L 3/023; B62L 3/02
See application file for complete search history.

(56) References Cited

U.S. PATENT DOCUMENTS

| | | | |
|---|---|---|---|
| 4,735,106 A * | 4/1988 | Yoshigai | B62L 1/12 188/196 BA |
| 4,921,081 A * | 5/1990 | Chilcote | B62L 3/023 188/344 |
| 9,120,522 B1 | 9/2015 | Nishino | |
| 9,592,879 B2 * | 3/2017 | Fukao | B62K 23/06 |
| 9,896,150 B2 * | 2/2018 | Fujiwara | B62L 3/023 |
| 2012/0241261 A1 * | 9/2012 | Tsai | F16D 55/225 188/24.21 |
| 2013/0032000 A1 * | 2/2013 | Miki | B62M 25/04 74/491 |
| 2014/0352478 A1 | 12/2014 | Gao | |
| 2015/0090112 A1 * | 4/2015 | Matsueda | B62L 3/023 92/15 |
| 2015/0090550 A1 * | 4/2015 | Matsueda | B62L 3/023 188/344 |
| 2015/0274252 A1 * | 10/2015 | Nishino | B62L 3/023 92/161 |
| 2017/0305493 A1 * | 10/2017 | Komada | B62K 23/06 |

FOREIGN PATENT DOCUMENTS

| | | |
|---|---|---|
| CN | 104210612 | 12/2014 |
| CN | 105083450 | 11/2015 |

\* cited by examiner

*Primary Examiner* — Thomas E Lazo
(74) *Attorney, Agent, or Firm* — Mori & Ward, LLP

(57) ABSTRACT

A bicycle operating device comprises a base member and an operating member. The base member includes a hydraulic-unit attachment part to which a hydraulic unit is to be attached, and a first end portion to be mounted to a handlebar. The operating member is movably coupled to the base member. The operating member includes a first wire attachment part to which a first wire end of a control wire is to be attached.

26 Claims, 18 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member and an operating member. The base member includes a hydraulic-unit attachment part to which a hydraulic unit is to be attached, and a first end portion to be mounted to a handlebar. The operating member is movably coupled to the base member. The operating member includes a first wire attachment part to which a first wire end of a control wire is to be attached.

With the bicycle operating device according to the first aspect, the first wire attachment part allows the user to operate a wire-actuated bicycle component via the control wire. Furthermore, it is possible to attach the hydraulic unit to the base member via the hydraulic-unit attachment part. This allows the user to utilize the bicycle operating device to operate one of the hydraulic bicycle component and the wire-actuated bicycle component. Thus, it is possible to commonalize the bicycle operating device for the hydraulic bicycle component and the wire-actuated bicycle component, reducing manufacturing cost of the bicycle operating device.

In accordance with a second aspect of the present invention, the bicycle operating device according to the first aspect further comprises the hydraulic unit operatively coupled to the operating member to generate a hydraulic pressure in response to a movement of the operating member. The hydraulic unit is attached to the hydraulic-unit attachment part.

With the bicycle operating device according to the second aspect, it is possible to operate the hydraulic bicycle component by using the hydraulic unit attached to the hydraulic-unit attachment part.

In accordance with a third aspect of the present invention, the bicycle operating device according to any one of the above aspects further comprises the control wire coupling the operating member to the hydraulic unit to transmit the movement of the operating member to the hydraulic unit. The first wire end of the control wire is attached to the first wire attachment part.

With the bicycle operating device according to the third aspect, it is possible to operate the hydraulic unit via a simple structure such as the control wire.

In accordance with a fourth aspect of the present invention, the bicycle operating device according to any one of the above aspects is configured so that the hydraulic unit includes a second wire attachment part. The control wire includes the first wire end and a second wire end opposite to the first wire end. The second wire end is attached to the second wire attachment part.

With the bicycle operating device according to the fourth aspect, it is possible to certainly operate the hydraulic unit via a simple structure such as the control wire.

In accordance with a fifth aspect of the present invention, the bicycle operating device according to any one of the above aspects is configured so that the hydraulic unit includes a hydraulic cylinder and a piston. The hydraulic cylinder includes a cylinder bore. The piston is movably provided in the cylinder bore. The second wire attachment part is operatively coupled to the piston to transmit the movement of the operating member to the piston via the control wire.

With the bicycle operating device according to the fifth aspect, it is possible to move the piston relative to the hydraulic cylinder in response to the movement of the operating member.

In accordance with a sixth aspect of the present invention, the bicycle operating device according to any one of the above aspects is configured so that the second wire attachment part is pivotally coupled to the hydraulic cylinder about a cable pivot axis.

With the bicycle operating device according to the sixth aspect, it is possible to reduce load applied to the hydraulic cylinder via the second wire attachment part compared with a case where the second wire attachment part is secured to the hydraulic cylinder.

In accordance with a seventh aspect of the present invention, the bicycle operating device according to any one of the above aspects is configured so that the operating member is pivotable relative to the base member about an operating pivot axis. The cable pivot axis is parallel to the operating pivot axis.

With the bicycle operating device according to the seventh aspect, it is possible to easily transmit the movement of the operating member to the piston.

In accordance with an eighth aspect of the present invention, the bicycle operating device according to any one of the above aspects is configured so that the second wire attachment part includes an attachment base and a fastener coupled to the attachment base. The second wire end of the control wire is coupled to the attachment base with the fastener.

With the bicycle operating device according to the eighth aspect, it is possible to detachably attach the second wire end of the control wire to the second wire attachment part.

In accordance with a ninth aspect of the present invention, the bicycle operating device according to any one of the above aspects is configured so that the hydraulic unit includes a hydraulic cylinder and a piston. The hydraulic cylinder includes a cylinder bore. The piston is movably provided in the cylinder bore. The attachment base is pivotally coupled to the hydraulic cylinder about a cable pivot axis.

With the bicycle operating device according to the ninth aspect, it is possible to move the piston relative to the hydraulic cylinder in response to the movement of the operating member.

In accordance with a tenth aspect of the present invention, the bicycle operating device according to any one of the above aspects is configured so that the attachment base includes a threaded hole. The fastener includes an externally threaded portion threadedly engaged with the threaded hole.

With the bicycle operating device according to the tenth aspect, it is possible to detachably attach the second wire end of the control wire to the second wire attachment part of the hydraulic unit via a simple structure.

In accordance with an eleventh aspect of the present invention, the bicycle operating device according to any one of the above aspects is configured so that the fastener includes a head portion provided at an end of the externally threaded portion. The head portion has a first outer diameter. The externally threaded portion has a second outer diameter. The first outer diameter is larger than the second outer diameter.

With the bicycle operating device according to the eleventh aspect, it is possible to detachably attach the second wire end of the control wire to the second wire attachment part of the hydraulic unit via a simple structure.

In accordance with a twelfth aspect of the present invention, the bicycle operating device according to any one of the above aspects is configured so that the second wire attachment part is farther from the operating member than at least one of the hydraulic cylinder and the piston.

With the bicycle operating device according to the twelfth aspect, it is possible to utilize a space disposed on an opposite side of the operating member relative to the at least one of the hydraulic cylinder and the piston for the second wire attachment part.

In accordance with a thirteenth aspect of the present invention, the bicycle operating device according to any one of the above aspects is configured so that the second wire attachment part is closer to the operating member than at least one of the hydraulic cylinder and the piston.

With the bicycle operating device according to the thirteenth aspect, it is possible to utilize a space disposed between the operating member and the at least one of the hydraulic cylinder and the piston for the second wire attachment part.

In accordance with a fourteenth aspect of the present invention, the bicycle operating device according to any one of the above aspects is configured so that the hydraulic cylinder is a separate member from the base member and is detachably attached to the hydraulic-unit attachment part.

With the bicycle operating device according to the fourteenth aspect, it is possible to detach the hydraulic unit from the base member when the hydraulic unit is not necessary. This saves weight of the bicycle operating device.

In accordance with a fifteenth aspect of the present invention, the bicycle operating device according to any one of the above aspects is configured so that the hydraulic cylinder is integrally provided with the base member as a one-piece unitary member.

With the bicycle operating device according to the fifteenth aspect, it is possible to easily ensure necessary strength of the bicycle operating device.

In accordance with a sixteenth aspect of the present invention, the bicycle operating device according to any one of the above aspects is configured so that the base member includes an internal space in which the hydraulic unit is to be disposed.

With the bicycle operating device according to the sixteenth aspect, it is possible to utilize the internal space of the base member as a space to arrange the hydraulic unit.

In accordance with a seventeenth aspect of the present invention, the bicycle operating device according to any one of the above aspects is configured so that the hydraulic-unit attachment part is disposed in the internal space.

With the bicycle operating device according to the seventeenth aspect, it is possible to utilize the internal space of the base member as a space for the hydraulic-unit attachment part.

In accordance with an eighteenth aspect of the present invention, the bicycle operating device according to any one of the above aspects is configured so that the base member includes a second end portion opposite to the first end portion. The operating member is movably coupled to the second end portion.

With the bicycle operating device according to the eighteenth aspect, it is possible to provide a distance between the operating member and the handlebar. This allows the user to easily operate the operating member in a mounting state where the bicycle operating device is mounted to the handlebar.

In accordance with a nineteenth aspect of the present invention, the bicycle operating device according to any one of the above aspects is configured so that the hydraulic-unit attachment part is closer to the first end portion than the operating member.

With the bicycle operating device according to the nineteenth aspect, it is possible to utilize a space between the operating member and the first end portion to arrange the hydraulic-unit attachment part.

In accordance with a twentieth aspect of the present invention, the bicycle operating device according to any one of the above aspects is configured so that the hydraulic-unit attachment part is disposed between the first end portion and the second end portion.

With the bicycle operating device according to the twentieth aspect, it is possible to utilize a space between the first end portion and the second end portion to arrange the hydraulic-unit attachment part.

In accordance with a twenty-first aspect of the present invention, the bicycle operating device according to any one of the above aspects further comprises an electrical switch mounted to the operating member.

With the bicycle operating device according to the twenty-first aspect, it is possible to operate an electrical bicycle component via the electrical switch in addition to one of the hydraulic bicycle component and the wire-actuated bicycle component.

In accordance with a twenty-second aspect of the present invention, the bicycle operating device according to any one of the above aspects further comprises an additional operating member movably coupled to the operating member to operate the electrical switch.

With the bicycle operating device according to the twenty-second aspect, it is possible to easily operate the electrical switch via the additional operating member.

In accordance with a twenty-third aspect of the present invention, the bicycle operating device according to any one of the above aspects further comprises a wireless communication unit connected to the electrical switch to transmit a wireless signal based on an input from the electrical switch.

With the bicycle operating device according to the twenty-third aspect, it is possible to operate an electrical bicycle component via wireless communication.

In accordance with a twenty-fourth aspect of the present invention, the bicycle operating device according to any one of the above aspects further comprises a signal controller connected to the electrical switch to transmit a control signal via an electrical control cable based on an input from the electrical switch.

With the bicycle operating device according to the twenty-fourth aspect, it is possible to operate an electrical bicycle component via the electrical control cable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
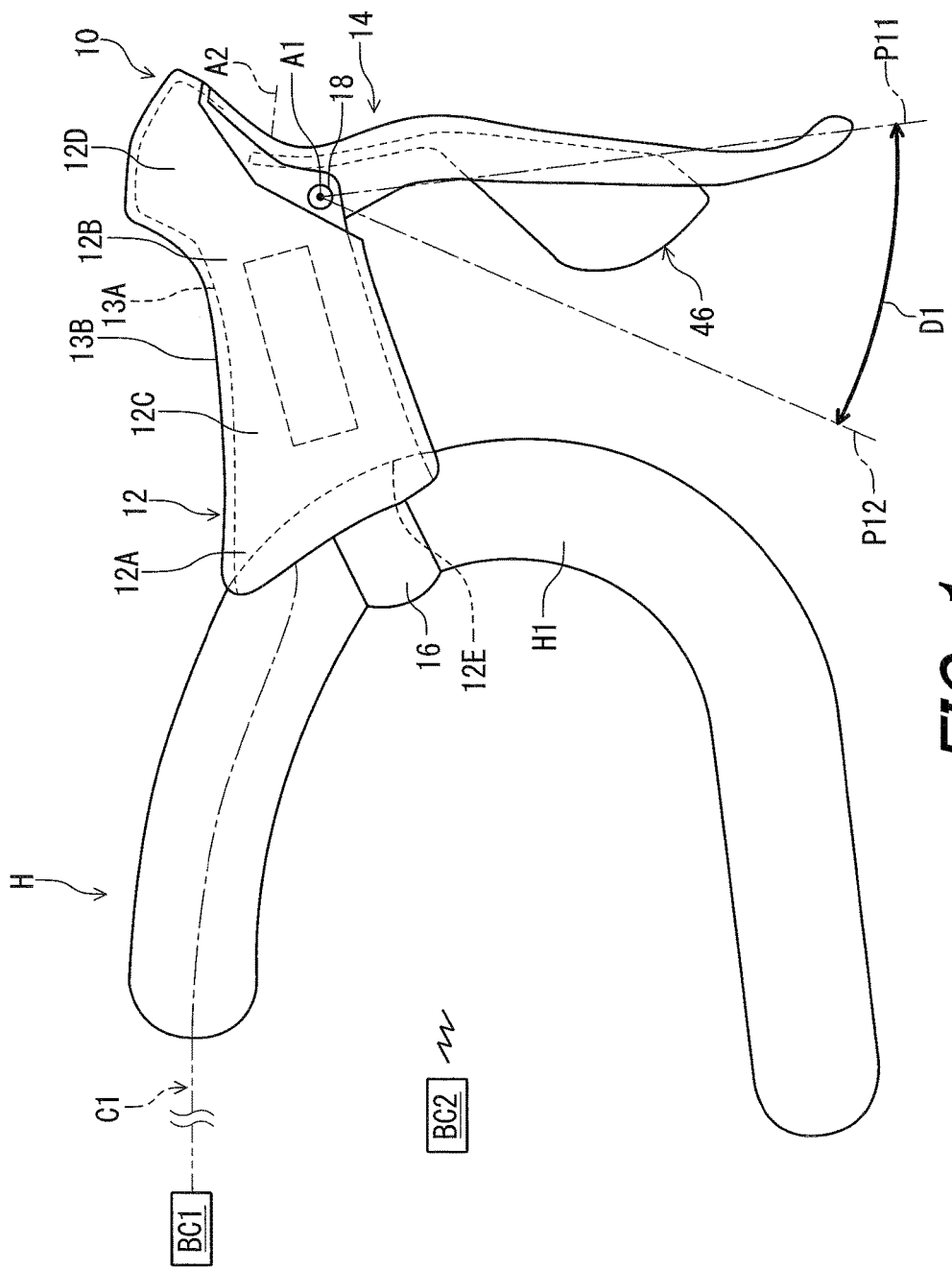
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H. In this embodiment, the bicycle operating device 10 is configured to be mounted to a drop-down handlebar. However, structures of the bicycle operating device 10 can be applied to other operating devices mounted to other type of handlebars H such as a flat handlebar H, a time trial handlebar H, and a bull horn handlebar H. The handlebar H can also be referred to as the drop-down handlebar H.

The bicycle operating device 10 is operatively coupled to a hydraulic bicycle component BC1 such as a hydraulic bicycle brake. In this embodiment, the bicycle operating device 10 is operatively coupled to the hydraulic bicycle component BC1 via a control element C1. In this embodiment, the control element C1 is a hydraulic hose. The control element C1 can also be referred to as the hydraulic hose C1. However, the control element C1 can be other elements such as a mechanical control cable. In such an embodiment, the bicycle operating device 10 is operatively coupled to a wire-actuated bicycle component such as a wire-actuated bicycle brake.

Furthermore, the bicycle operating device 10 is operatively connected to the electrical bicycle component BC2 via wireless communication. Examples of the electrical bicycle component BC2 include an electric shifting device, an electric suspension, and an electric seatpost. In this embodiment, the bicycle operating device 10 is operatively connected to an electric shifting device as the electrical bicycle component BC2 via wireless communication. The electrical bicycle component BC2 can also be referred to as the electric shifting device BC2. Examples of the electric shifting device BC2 include a derailleur and an internal-gear hub.

In this embodiment, the bicycle operating device 10 is a right hand side control device configured to be operated by the rider's right hand to actuate the hydraulic bicycle component BC1 and the electrical bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

Figure 2:
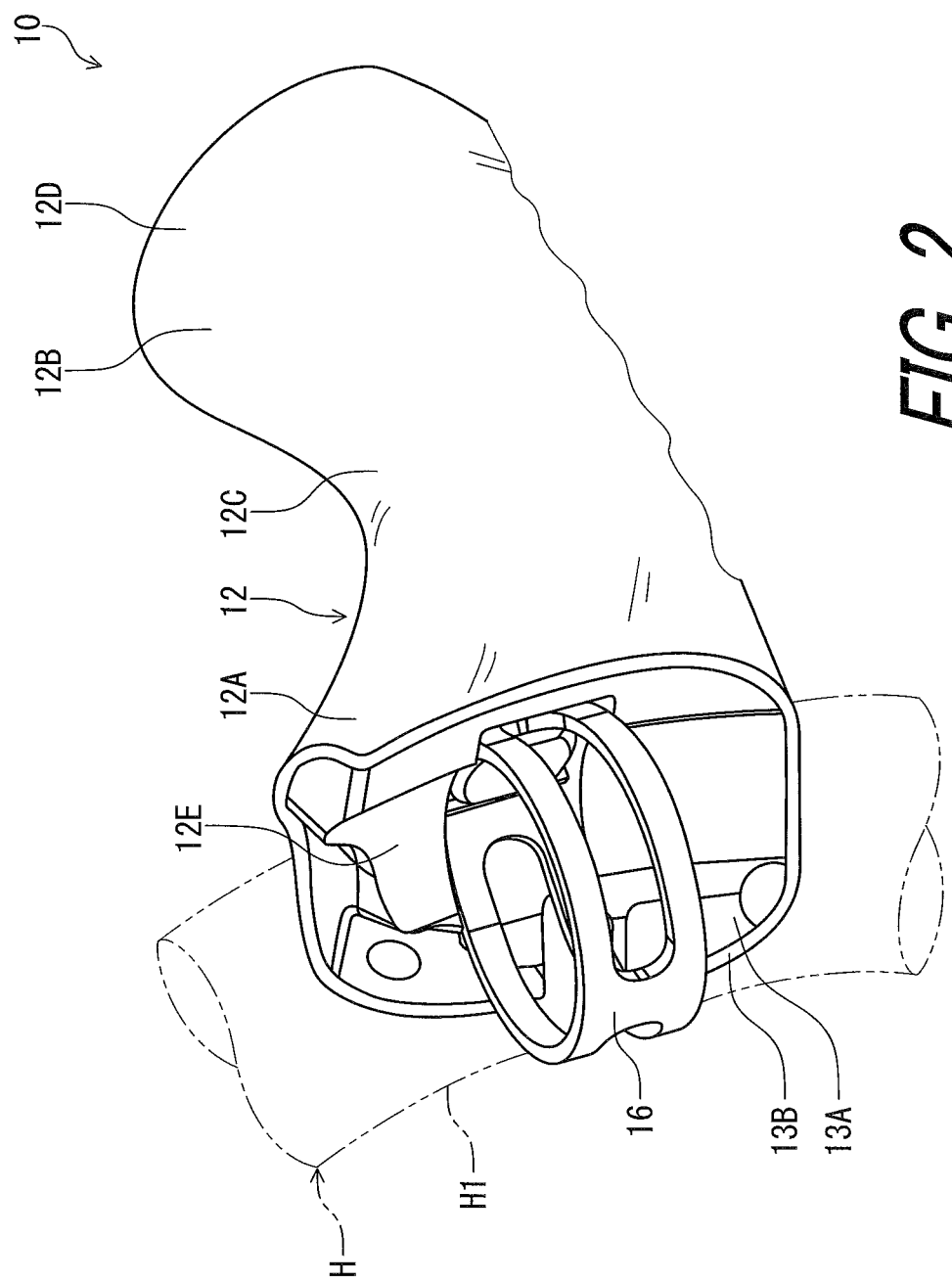
FIG. 2 is a partial perspective view of the bicycle operating device illustrated in FIG. 1.

As seen in FIG. 1, the bicycle operating device 10 comprises a base member 12 and an operating member 14. The base member 12 includes a first end portion 12A to be mounted to the handlebar H. The base member 12 includes a second end portion 12B opposite to the first end portion 12A. The drop-down handlebar H includes a curved part H1. The first end portion 12A is configured to be coupled to the curved part H1 in the mounting state where the bicycle operating device 10 is mounted to the handlebar H. The bicycle operating device 10 comprises a mounting clamp 16 to couple the base member 12 to the handlebar H. As seen in FIG. 2, the first end portion 12A includes a mounting surface 12E having a curved shape corresponding to the drop-down handlebar H. Specifically, the mounting surface 12E has the curved shape corresponding to an outer peripheral surface of the curved part H1.

As seen in FIGS. 1 and 2, the second end portion 12B is opposite to the first end portion 12A. The base member 12 includes a grip portion 12C arranged between the first end portion 12A and the second end portion 12B. The second end portion 12B includes a pommel portion 12D. The pommel portion 12D extends obliquely upward from the grip portion 12C. The pommel portion 12D is disposed at a position higher than a position of the first end portion 12A in the mounting state of the bicycle operating device 10. The pommel portion 12D can also be configured to be graspable if needed and/or desired.

In this embodiment, the base member 12 includes a base body 13A and a grip cover 13B. The grip cover 13B at least partly covers the base body 13A and is made of an elastic material such as rubber. The first end portion 12A, the second end portion 12B, the grip portion 12C, and the pommel portion 12D are constituted by at least one of the base body 13A and the grip cover 13B. The grip cover 13B can be omitted from the base member 12.

As seen in FIG. 1, the operating member 14 is movably coupled to the base member 12. The operating member 14 is movably coupled to the second end portion 12B. In this embodiment, the operating member 14 is movably coupled to the second end portion 12B. The operating member 14 is pivotally coupled to the base member 12 in a first direction D1. Specifically, the operating member 14 is pivotable relative to the base member 12 about an operating pivot axis A1. The operating member 14 is pivotable relative to the base member 12 about the operating pivot axis A1 in the first direction D1. The operating member 14 is pivotable relative to the base member 12 between a first rest position P11 and a first operated position P12. In other words, the operating member 14 is provided as a brake operating lever pivotable about the operating pivot axis A1. In this embodiment, the first direction D1 is a circumferential direction defined about the operating pivot axis A1.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the bicycle component.

Figure 3:
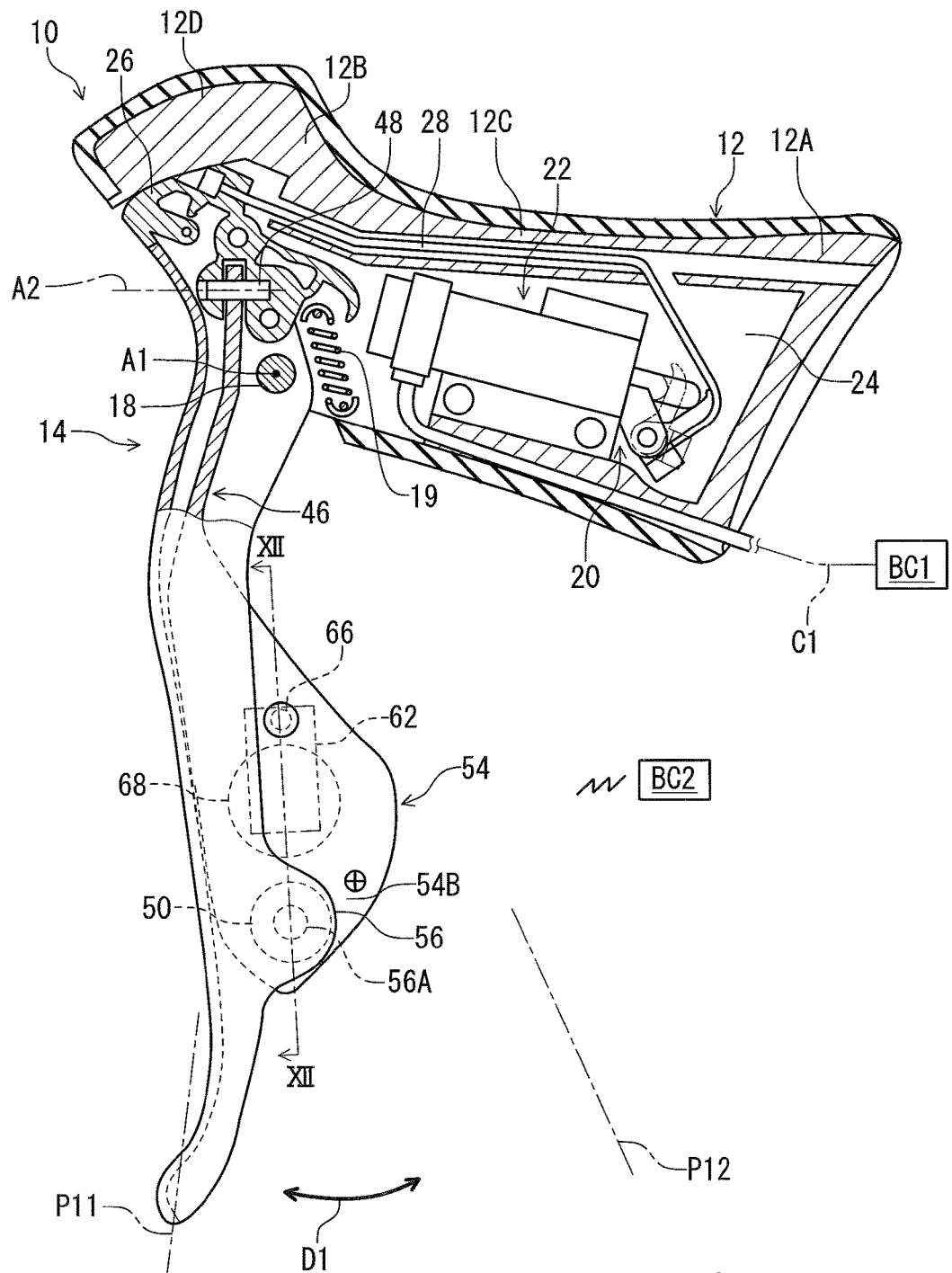
FIG. 3 is a left side elevational view of the bicycle operating device illustrated in FIG. 1, with a partial cross-section.

As seen in FIG. 3, the operating member 14 is pivotally coupled to the base member 12 via a first pivot pin 18. The first pivot pin 18 defines the operating pivot axis A1. The bicycle operating device 10 comprises a first biasing member 19 to bias the operating member 14 toward the first rest position P11 relative to the base member 12. Thus, the operating member 14 is at the first rest position P11 in a state where the operating member 14 is not operated by the user.

Figure 4:
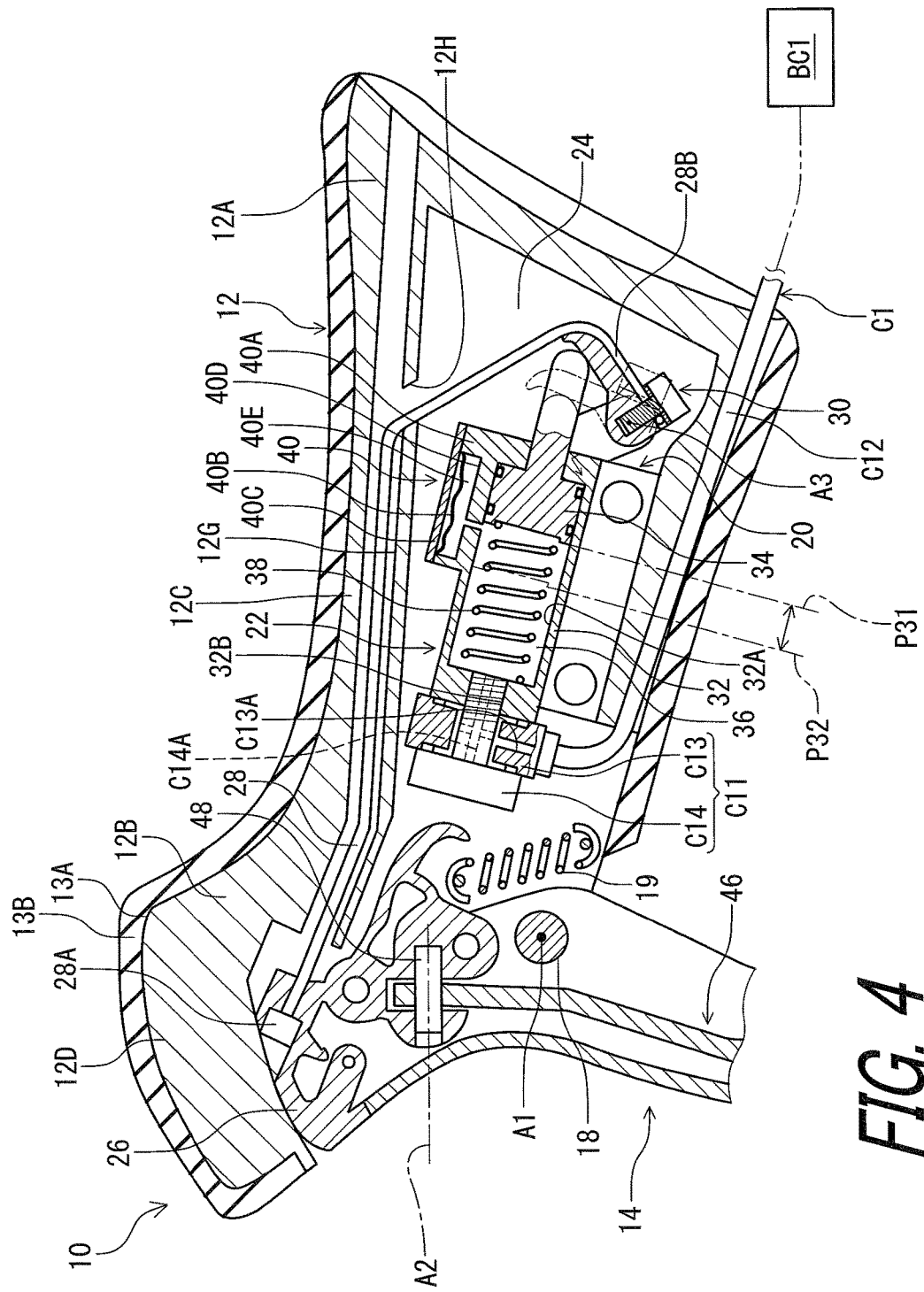
FIG. 4 is a partial cross-sectional view of the bicycle operating device illustrated in FIG. 1, with a hydraulic unit.
Figure 5:
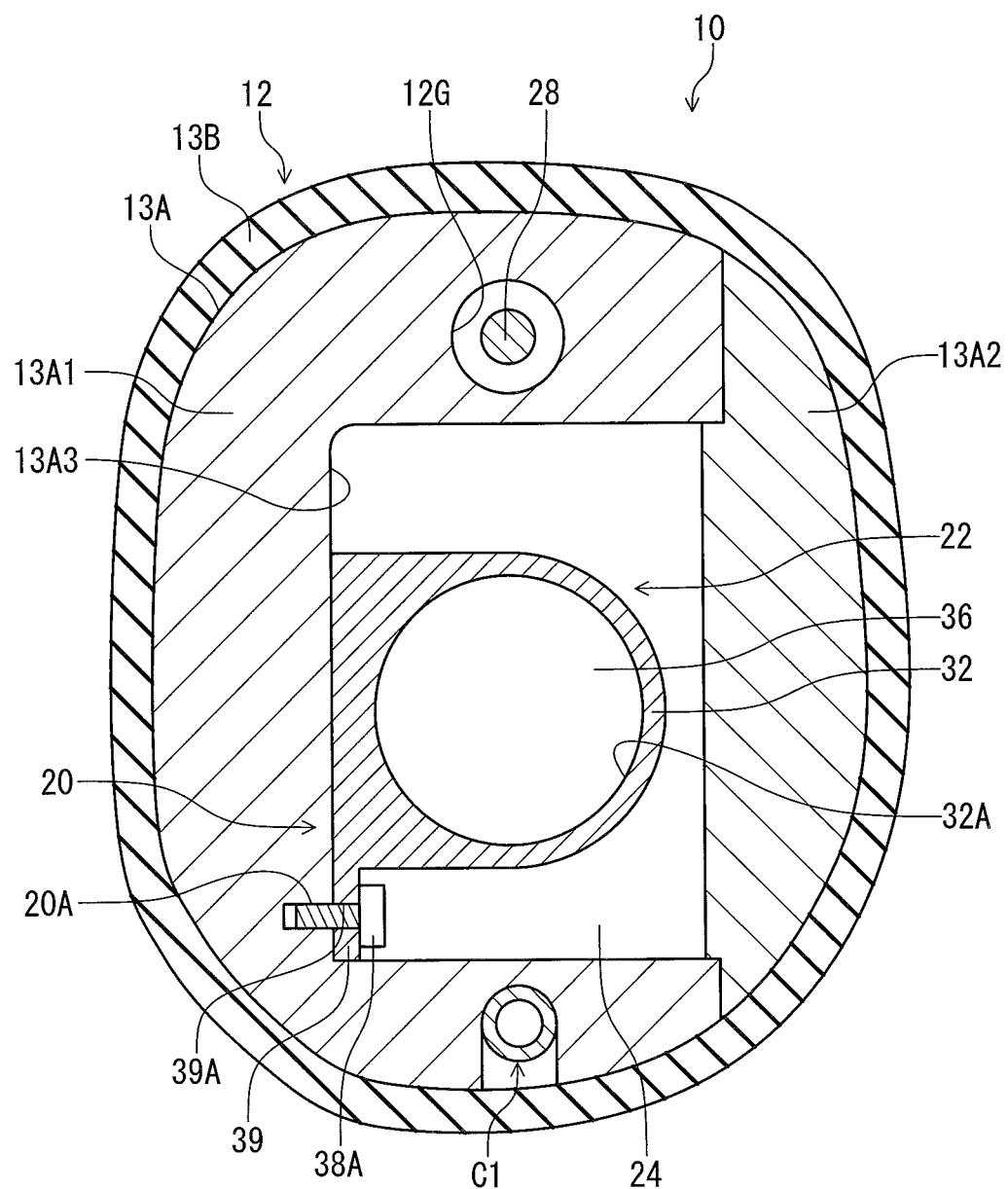
FIG. 5 is a cross-sectional view of the bicycle operating device taken along line V-V of FIG. 6.

As seen in FIGS. 4 and 5, the base member 12 includes a hydraulic-unit attachment part 20 to which a hydraulic unit 22 is to be attached. In this embodiment, the bicycle operating device 10 further comprises the hydraulic unit 22 operatively coupled to the operating member 14 to generate a hydraulic pressure in response to a movement of the operating member 14. The hydraulic unit 22 is attached to the hydraulic-unit attachment part 20. However, the hydraulic unit 22 can be omitted from the bicycle operating device 10. The base member 12 includes an internal space 24 in which the hydraulic unit 22 is to be disposed. The hydraulic-unit attachment part 20 is disposed in the internal space 24.

As seen in FIG. 4, the hydraulic-unit attachment part 20 is closer to the first end portion 12A than the operating member 14. The hydraulic-unit attachment part 20 is disposed between the first end portion 12A and the second end portion 12B. However, the arrangement of the hydraulic-unit attachment part 20 is not limited to this embodiment.

The operating member 14 includes a first wire attachment part 26 to which a first wire end 28A of a control wire 28 is to be attached. The bicycle operating device 10 further comprises the control wire 28 coupling the operating member 14 to the hydraulic unit 22 to transmit the movement of the operating member 14 to the hydraulic unit 22. The first wire end 28A of the control wire 28 is attached to the first wire attachment part 26. However, the control wire 28 can be omitted from the bicycle operating device 10 in a case where the hydraulic unit 22 is omitted from the bicycle operating device 10.

The hydraulic unit 22 includes a second wire attachment part 30. The control wire 28 includes the first wire end 28A and a second wire end 28B opposite to the first wire end 28A. The second wire end 28B is attached to the second wire attachment part 30. The second wire attachment part 30 is operatively coupled to the piston 34 to transmit the movement of the operating member 14 to the piston 34 via the control wire 28. The second wire attachment part 30 is pivotally coupled to the hydraulic cylinder 32 about a cable pivot axis A3. In this embodiment, the cable pivot axis A3 is parallel to the operating pivot axis A1. However, the cable pivot axis A3 can be non-parallel to the operating pivot axis A1.

Figure 6:
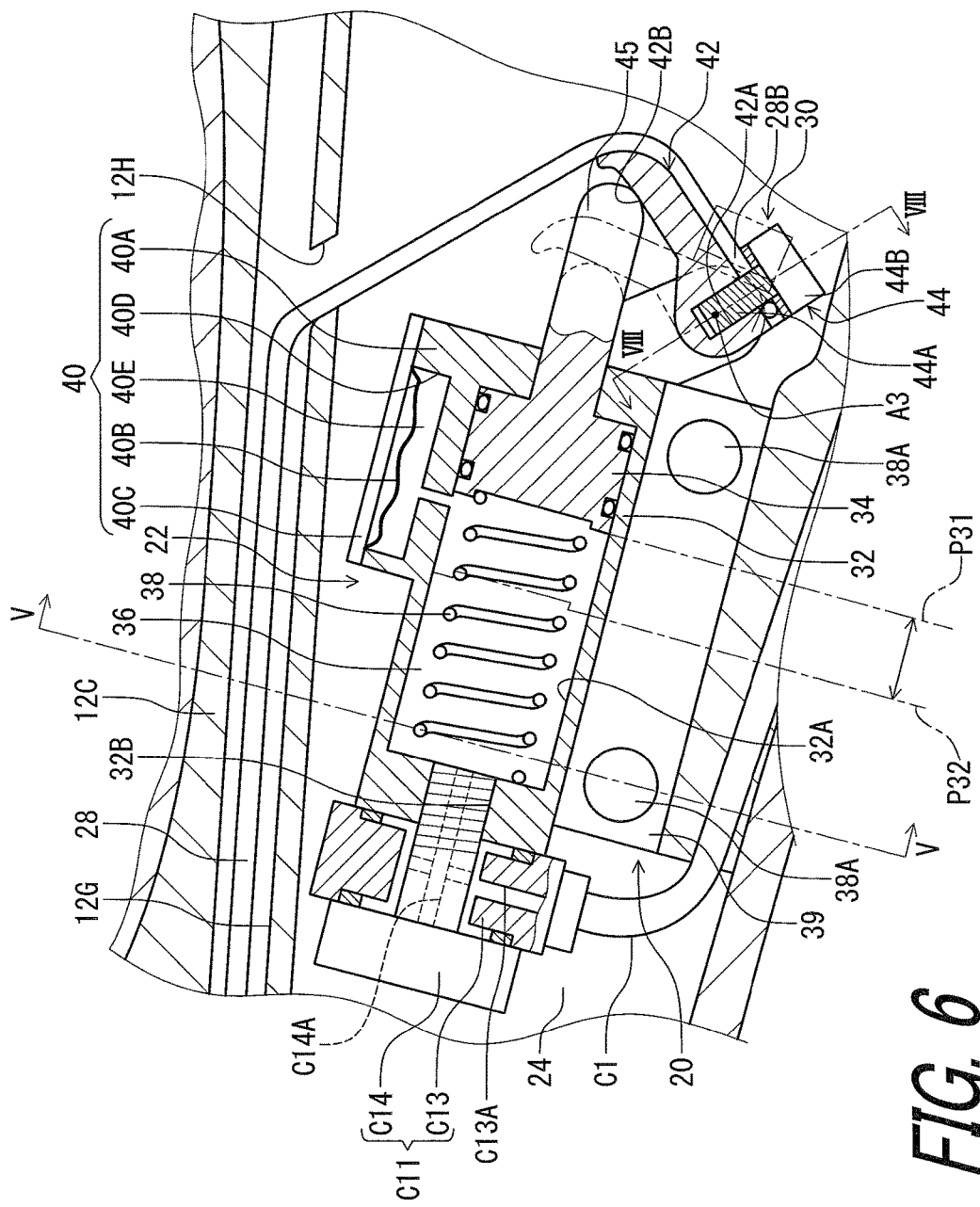
FIG. 6 is a partial enlarged cross-sectional view of the bicycle operating device illustrated in FIG. 1.

As seen in FIGS. 4 and 6, the hydraulic unit 22 includes a hydraulic cylinder 32 and a piston 34. The hydraulic cylinder 32 includes a cylinder bore 32A. The piston 34 is movably provided in the cylinder bore 32A. The piston 34 is movable relative to the hydraulic cylinder 32 between an initial position P31 and an actuated position P32. The initial position P31 corresponds to the first rest position P11 (FIG. 3) of the operating member 14. The actuated position P32 corresponds to the first operated position P12 (FIG. 3) of the operating member 14. Specifically, the piston 34 is at the initial position P31 in a rest state where the operating member 14 is at the first rest position P11 (FIG. 3). The piston 34 is at the actuated position P32 in an operated state where the operating member 14 is at the first operated position P12 (FIG. 3).

The hydraulic cylinder 32 and the piston 34 define a hydraulic chamber 36 in the cylinder bore 32A. The hydraulic unit 22 includes a piston biasing element 38. The piston biasing element 38 is disposed in the hydraulic chamber 36 to bias the piston 34 toward the initial position P31.

The hydraulic unit 22 includes a hydraulic reservoir 40. The hydraulic reservoir 40 is connected to the hydraulic chamber 36. The hydraulic reservoir 40 includes a reservoir tank 40A, a diaphragm 40B, and a lid 40C. The reservoir tank 40A includes a recess 40D. In this embodiment, the reservoir tank 40A is integrally provided with the hydraulic cylinder 32 as a one-piece unitary member. However, the reservoir tank 40A can be a separate member from the hydraulic cylinder 32. The diaphragm 40B is disposed in the recess 40D. The reservoir tank 40A and the diaphragm 40B define a reservoir chamber 40E in the recess 40D. The lid 40C covers the recess 40D. The hydraulic reservoir 40 can be omitted from the bicycle operating device 10.

The hydraulic hose C1 is connected to the hydraulic chamber 36. In this embodiment, the hydraulic hose C1 includes a hose attachment part C11 and a hose body C12. The hose attachment part C11 is attached to an end of the hose body C12. The hose attachment part C11 is coupled to the hydraulic cylinder 32. In this embodiment, the hose attachment part C11 includes a banjo C13 and a banjo bolt C14. The banjo C13 is attached to the end of the hose body C12 and is coupled to the hydraulic cylinder 32 with the banjo bolt C14. The hydraulic cylinder 32 includes a connection threaded hole 32B connected to the hydraulic chamber 36. The banjo bolt C14 is threadedly engaged with the connection threaded hole 32B. The banjo C13 includes a fluid passageway C13A. The banjo bolt C14 includes a fluid passageway C14A. The hose body C12 is connected to the hydraulic chamber 36 via the fluid passageways C13A and C14A in a state where the banjo C13 is coupled to the hydraulic cylinder 32 with the banjo bolt C14.

Figure 9:
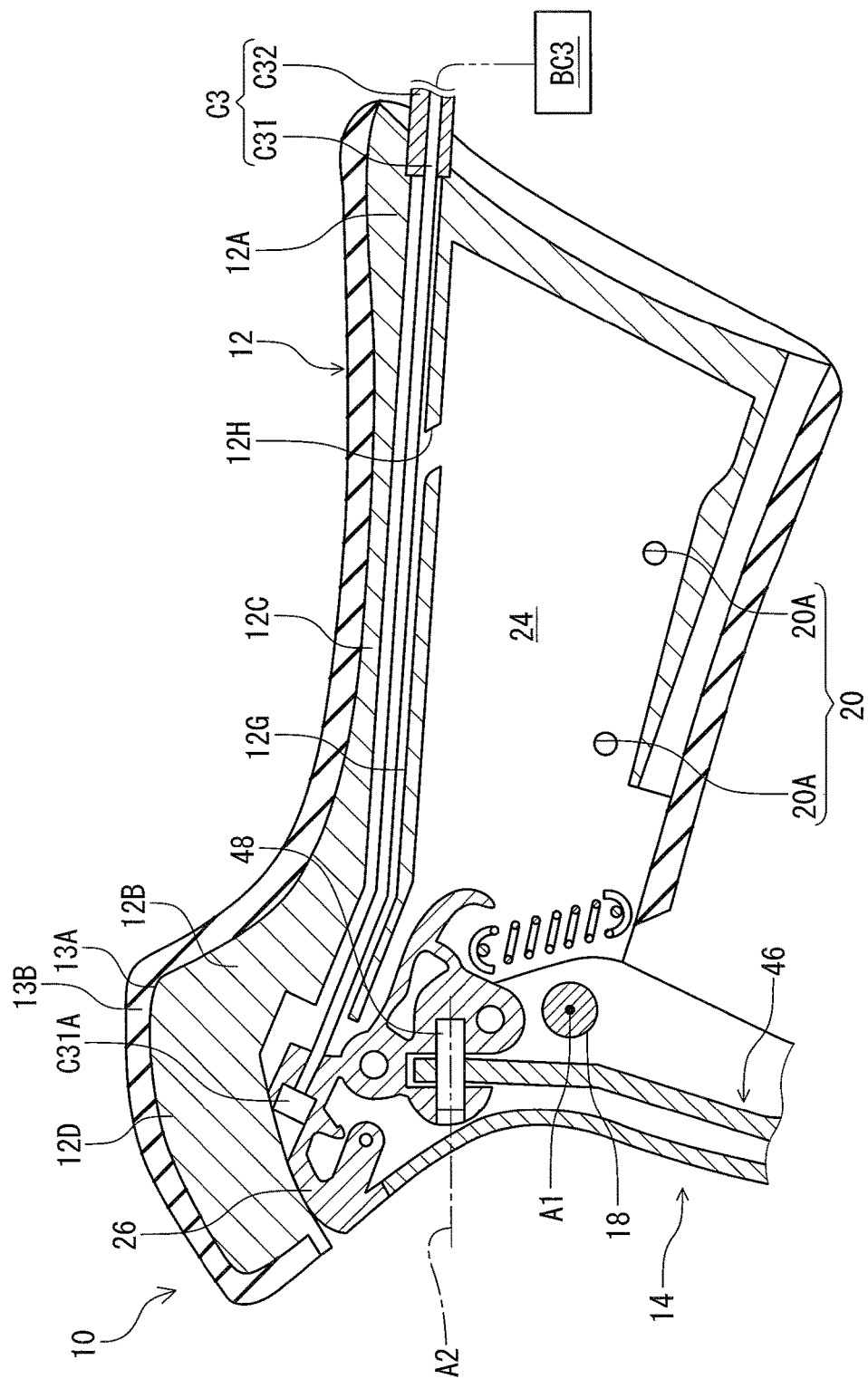
FIG. 9 is a partial cross-sectional view of the bicycle operating device illustrated in FIG. 1, with the hydraulic unit omitted.

In this embodiment, as seen in FIG. 5, the hydraulic cylinder 32 is a separate member from the base member 12 and is detachably attached to the hydraulic-unit attachment part 20. However, the hydraulic cylinder 32 can be integrally provided with the hydraulic-unit attachment part 20. The hydraulic cylinder 32 is secured to the base member 12 with screws 38A (FIG. 6). The hydraulic-unit attachment part 20 includes attachment threaded holes 20A (FIG. 9). The screws 38A are respectively engaged threadedly with the attachment threaded holes 20A. The hydraulic unit 22 includes a coupling part 39. The coupling part 39 extends from the hydraulic cylinder 32. The coupling part 39 includes through-holes 39A. The screws 38A respectively extend through the through-holes 39A.

In the present application, the term "detachably attached" or "detachably attaching", as used herein, encompasses configurations in which an element directly attached to another element by directly affixing the element to the other element while the element is detachable from the other element without damage; and configurations in which the element is indirectly attached to the other element via intermediate member(s) while the element is detachable from the other element and the intermediate member(s) without damage.

The base body 13A includes a main body 13A1 and base lid 13A2. The main body 13A1 includes a base recess 13A3. The base lid 13A2 is attached to the main body 13A1 to cover an opening of the base recess 13A3. The base lid 13A2 is detachably attached to the main body 13A1 with screws (not shown). The main body 13A1 and the base lid 13A2 define the internal space 24 in the base recess 13A3. The hydraulic unit 22 can be detached from or attached to the main body 13A1 in a state where the base lid 13A2 is detached from the main body 13A1.

As seen in FIG. 4, the base member 12 includes a first wire passageway 12G and a second wire passageway 12H. The first wire passageway 12G extends between the first end portion 12A and the second end portion 12B. The second wire passageway 12H extends from the first wire passageway 12G to the internal space 24 to connect the first wire passageway 12G to the internal space 24. The control wire 28 extends through the first wire passageway 12G and the second wire passageway 12H.

Figure 7:
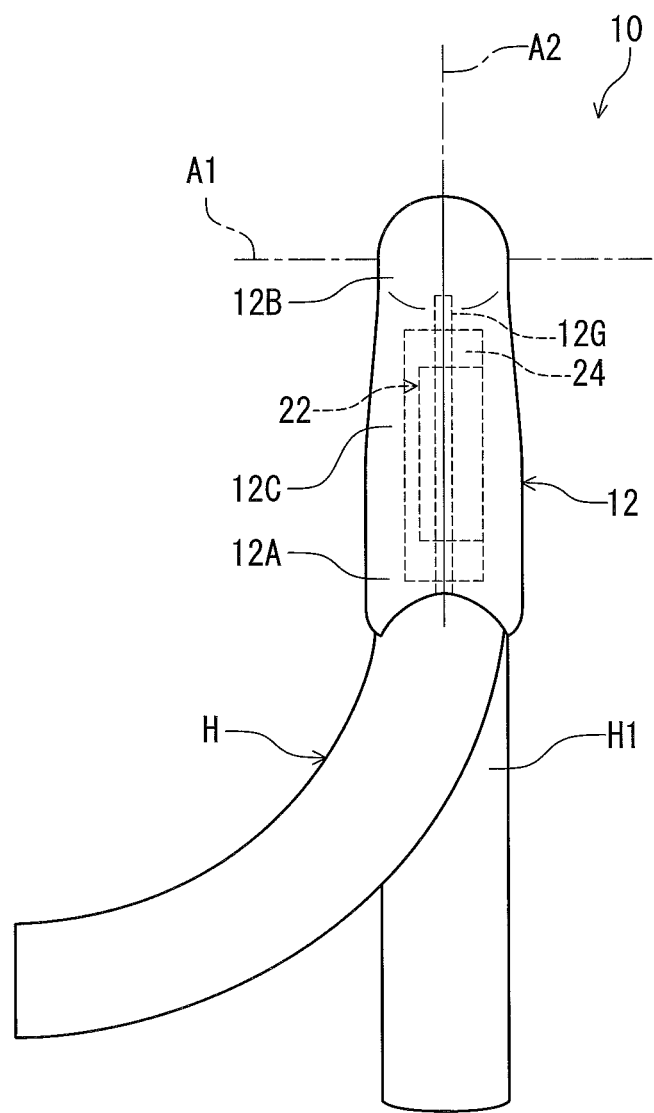
FIG. 7 is a top view of the bicycle operating device illustrated in FIG. 1.

As seen in FIG. 7, the first wire passageway 12G at least partly overlaps with the hydraulic unit 22 when viewed from above the bicycle operating device 12 in the mounting state of the bicycle operating device 10. The first wire passageway 12G at least partly overlaps with the internal space 24 when viewed from above the bicycle operating device 12 in the mounting state of the bicycle operating device 10. In this embodiment, the first wire passageway 12G partly overlaps with the hydraulic unit 22 when viewed from above the bicycle operating device 12 in the mounting state of the bicycle operating device 10. The first wire passageway 12G partly overlaps with the internal space 24 when viewed from above the bicycle operating device 12 in the mounting state of the bicycle operating device 10. However, the first wire passageway 12G can entirely overlap with the hydraulic unit 22 when viewed from above the bicycle operating device 12 in the mounting state of the bicycle operating device 10. The first wire passageway 12G can entirely overlap with the internal space 24 when viewed from above the bicycle operating device 12 in the mounting state of the bicycle operating device 10.

Figure 8:
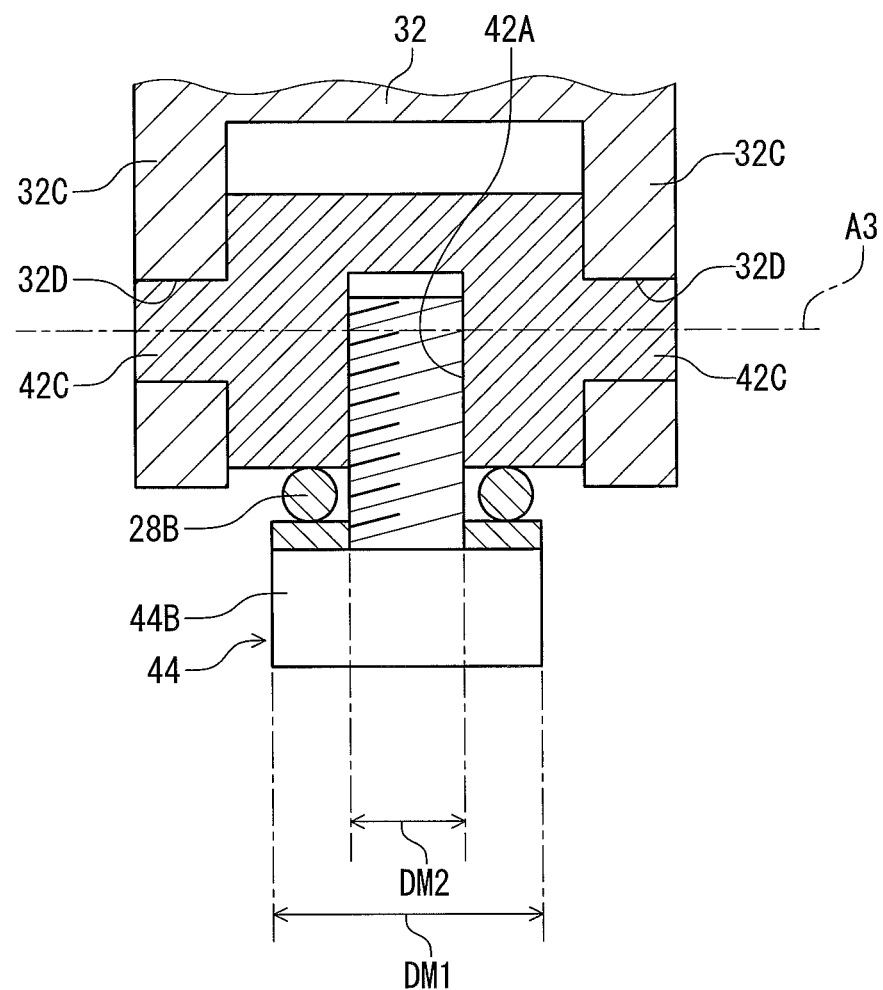
FIG. 8 is a cross-sectional view of the bicycle operating device taken along line VIII-VIII of FIG. 6.

As seen in FIGS. 6 and 8, the second wire attachment part 30 includes an attachment base 42 and a fastener 44. The fastener 44 is coupled to the attachment base 42. The attachment base 42 is pivotally coupled to the hydraulic cylinder 32 about a cable pivot axis A3. The second wire end 28B of the control wire 28 is coupled to the attachment base 42 with the fastener 44. The attachment base 42 includes a threaded hole 42A. The fastener 44 includes an externally threaded portion 44A threadedly engaged with the threaded hole 42A. The fastener 44 includes a head portion 44B provided at an end of the externally threaded portion 44A. As seen in FIG. 8, the head portion 44B has a first outer diameter DM1. The externally threaded portion 44A has a second outer diameter DM2. The first outer diameter DM1 is larger than the second outer diameter DM2. The second wire end 28B of the control wire 28 is held between the attachment base 42 and the head portion 44B of the fastener 44.

As seen in FIG. 6, the attachment base 42 includes a guide surface 42B. The hydraulic unit 22 includes a piston rod 45 coupled to the piston 34. The guide surface 42B is in contact with the piston rod 45. As seen in FIG. 8, the hydraulic cylinder 32 includes a pair of pivot supports 32C. The attachment base 42 includes a pair of pivot pins 42C. The pivot pins 42C respectively extend through pivot holes 32D of the pivot supports 32C. The attachment base 42 can include a groove to guide the control wire 28.

As seen in FIG. 4, the second wire attachment part 30 is farther from the operating member 14 than at least one of the hydraulic cylinder 32 and the piston 34. In this embodiment, the second wire attachment part 30 is farther from the operating member 14 than the hydraulic cylinder 32 and the piston 34. However, the second wire attachment part 30 can be closer from the operating member 14 than at least one of the hydraulic cylinder 32 and the piston 34.

The control wire 28 is pulled via the first wire attachment part 26 when the operating member 14 is pivoted relative to the base member 12 from the first rest position P11 toward the first operated position P12. Thus, the second wire attachment part 30 is pivoted relative to the hydraulic cylinder 32 about the cable pivot axis A3, moving the piston 34 relative to the hydraulic cylinder 32 from the initial position P31 toward the actuated position P32. This supplies the hydraulic pressure from the hydraulic unit 22 to the hydraulic bicycle component BC1 via the hydraulic hose C1.

As seen in FIG. 9, the hydraulic unit 22 can be omitted from the bicycle operating device 10. In a case where the hydraulic unit 22 is omitted from the bicycle operating device 10, the control wire 28 extends through the first wire passageway 12G without through the second wire passageway 12H. The bicycle operating device 10 is operatively coupled to a wire-actuated bicycle component BC3 via a control wire C31 of a control cable C3. An end C31A of the control wire C31 is attached to the first wire attachment part 26. The control cable C3 includes an outer casing C32. The control wire C31 is movably provided in the outer casing C32. Examples of the control cable C3 include a Bowden cable. This allows the user to operate the wire-actuated bicycle component BC3 via the bicycle operating device 10.

Figure 10:
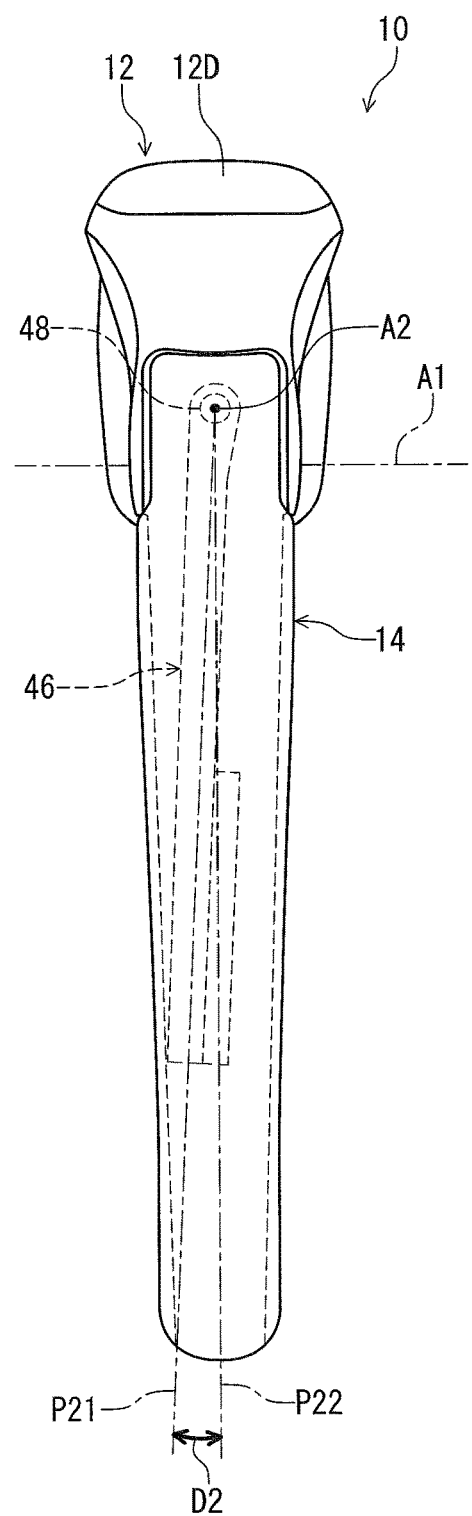
FIG. 10 is a front view of the bicycle operating device illustrated in FIG. 1.

As seen in FIGS. 3 and 10, the bicycle operating device 10 further comprises an additional operating member 46. The additional operating member 46 is movably coupled to the operating member 14. In this embodiment, the additional operating member 46 is pivotally coupled to the operating member 14 in a second direction D2. Specifically, the additional operating member 46 is pivotable relative to the operating member 14 about an additional operating pivot axis A2 in the second direction D2. While the second direction D2 is different from the first direction D1 in this embodiment, the second direction D2 can be equal to the first direction D1. The additional operating member 46 is pivotally coupled to the base member 12 via the operating member 14. Thus, the additional operating member 46 is pivotable relative to the base member 12 about the operating pivot axis A1 together with the operating member 14.

Figure 11:
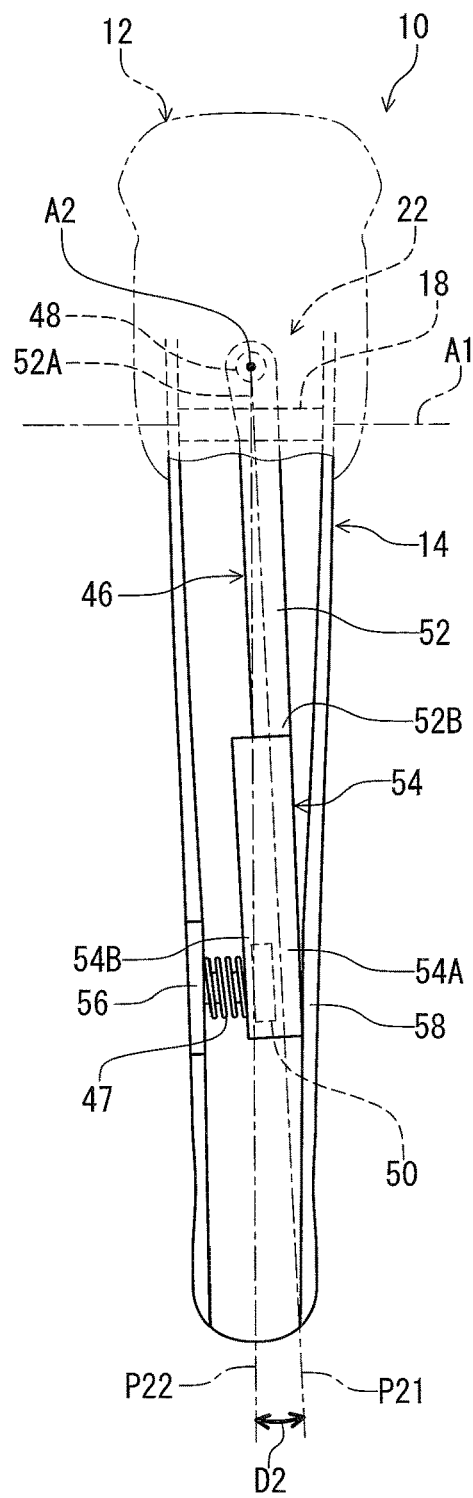
FIG. 11 is a partial rear view of the bicycle operating device illustrated in FIG. 1.

As seen in FIGS. 10 and 11, the additional operating member 46 is pivotable relative to the operating member 14 about the additional operating pivot axis A2 between a second rest position P21 and a second operated position P22. In this embodiment, the second direction D2 is a circumferential direction defined about the additional operating pivot axis A2. The additional operating member 46 is biased by a second biasing member 47 toward the second rest position P21 relative to the base member 12. The additional operating member 46 is at the second rest position P21 in a state where the additional operating member 46 is in contact with the operating member 14. Thus, the additional operating member 46 is at the second rest position P21 in a state where the additional operating member 46 is not operated by the user.

As seen in FIG. 3, the additional operating member 46 is at least partially closer to the first end portion 12A than the operating member 14 in a rest state where the operating member 14 is at the first rest position P11. However, the additional operating member 46 can be farther from the first end portion 12A than the operating member 14 in the rest state where the operating member 14 is at the first rest position P11.

The additional operating pivot axis A2 is disposed above the operating pivot axis A1 in the mounting state where the bicycle operating device 10 is mounted to the handlebar H. However, the additional operating pivot axis A2 can be disposed below the operating pivot axis A1 in the mounting state of the bicycle operating device 10. The additional operating pivot axis A2 can be disposed at the same height as a height of the operating pivot axis A1 in the mounting state of the bicycle operating device 10.

While the additional operating member 46 is used as a shift operating member in this embodiment, the additional operating member 46 can be used as an operating member other than the shift operating member. For example, the additional operating member 46 can be used as a suspension operating member in a case where the electrical bicycle component includes the electric suspension. The additional operating member 46 can be used as a seatpost operating member in a case where the electrical bicycle component includes the electric seatpost.

As seen in FIGS. 10 and 11, the bicycle operating device 10 comprises a second pivot pin 48. The second pivot pin 48 is attached to the operating member 14 and defines the additional operating pivot axis A2. The additional operating member 46 is pivotally coupled to the operating member 14 about the additional operating pivot axis A2 via the second pivot pin 48. As seen in FIG. 3, the second pivot pin 48 is attached to the first wire attachment part 26.

As seen in FIGS. 3 and 11, the bicycle operating device 10 further comprises an electrical switch 50 mounted to the operating member 14. The additional operating member 46 is movably coupled to the operating member 14 to operate the electrical switch 50. The electrical switch 50 is disposed at the additional operating member 46 to provide an electric signal in response to a movement of the additional operating member 46. In this embodiment, the electrical switch 50 is attached to the additional operating member 46 to move together with the additional operating member 46 in the second direction D2. The electrical switch 50 provides the electric signal in response to the movement of the additional operating member 46 in the second direction D2. While the electrical switch 50 is a normally open switch in this embodiment, other type of switches can be applied to the bicycle operating device 10.

While the electrical switch 50 is used as a shift control switch in this embodiment, the electrical switch 50 can be used as a switch other than the shift control switch. For example, the additional operating member 46 can be used as a suspension control switch in a case where the electrical bicycle component BC2 includes the electric suspension. The additional operating member 46 can be used as a seatpost control member in a case where the electrical bicycle component BC2 includes the electric seatpost.

Figure 12:
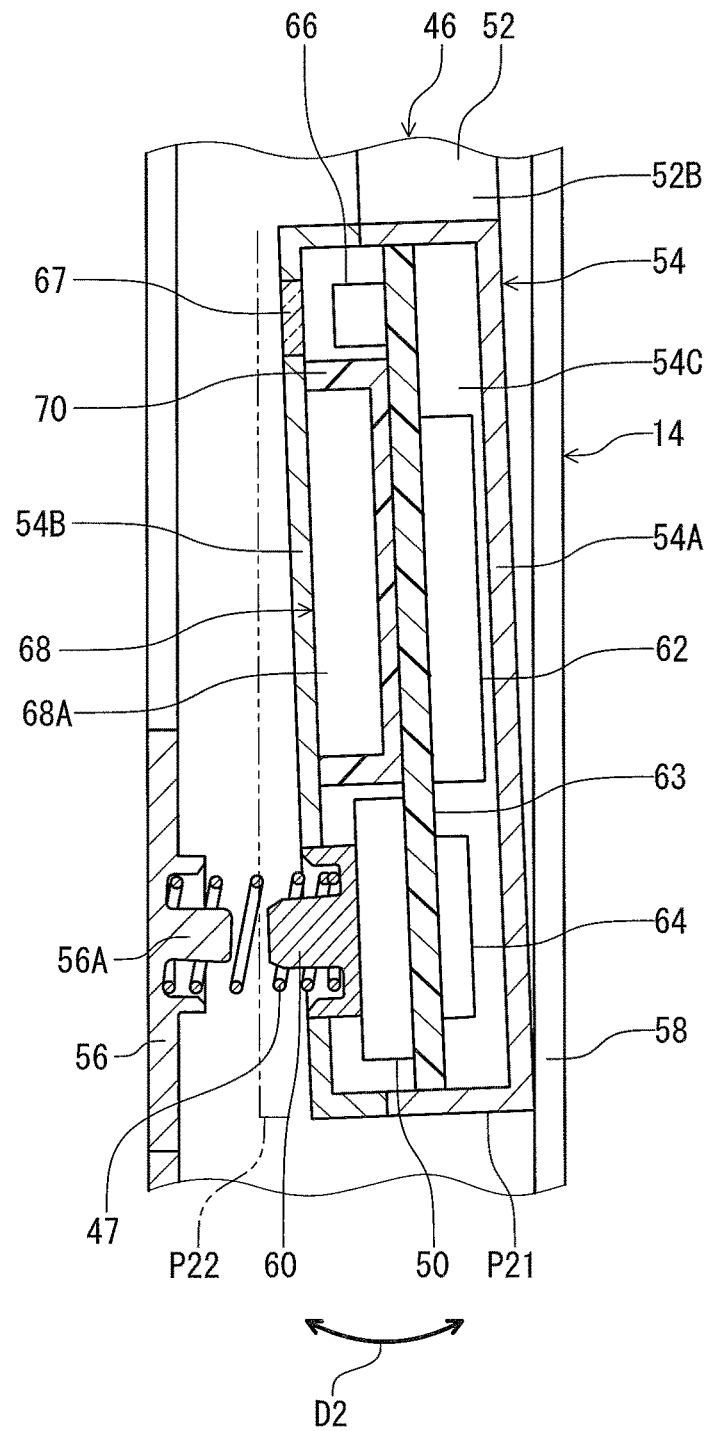
FIG. 12 is a cross-sectional view of the bicycle operating device taken along line XII-XII of FIG. 3.

As seen in FIGS. 11 and 12, the additional operating member 46 includes a lever 52. The lever 52 includes a first lever end 52A and a second lever end 52B. The first lever end 52A is pivotally coupled to the base member 12 about the additional operating pivot axis A2. The operating member 14 includes an attachment part 54. The electrical switch 50 is attached to the attachment part 54. The attachment part 54 includes an attachment base part 54A and a cover 54B. The cover 54B is detachably attached to the attachment base part 54A with fastener such as screws. An accommodation space 54C is defined by the attachment base part 54A and the cover 54B. The accommodation space 54C is sealed by seal members (not shown) in a state where the cover 54B is attached to the attachment base part 54A. The electrical switch 50 is disposed in the accommodation space 54C of the attachment part 54.

The operating member 14 includes an actuation part 56 disposed to face the electrical switch 50 to press the electrical switch 50 in response to the movement of the additional operating member 46. The actuation part 56 can be disposed at the base member 12.

As seen in FIG. 12, the actuation part 56 includes a projection 56A to face the electrical switch 50. The operating member 14 includes a receiving part 58. The receiving part 58 is spaced apart from the attachment part 54 in the second direction D2. The electrical switch 50 is disposed between the actuation part 56 and the receiving part 58 in the second direction D2. The additional operating member 46 is contactable with the receiving part 58.

The second biasing member 47 is disposed between the electrical switch 50 and the actuation part 56 to bias the additional operating member 46 toward the second rest position P21. Thus, the additional operating member 46 is positioned at the second rest position P21 by the receiving part 58 in a state where the additional operating member 46 is not operated by the user.

The bicycle operating device 10 comprise a button element 60 to transmit, to the electrical switch 50, the movement of the additional operating member 46 in the second direction D2. The button element 60 is disposed on the attachment part 54 to face the actuation part 56 in the second direction D2. Specifically, the button element 60 is disposed to face the projection 56A in the second direction D2. In this embodiment, the second biasing member 47 includes a coil spring. The second biasing member 47 is held by the projection 56A and the button element 60.

The button element 60 is in contact with the projection 56A in a state where the additional operating member 46 is at the second operated position P22. This contact closes the electrical switch 50 to provide the electric signal. The electrical switch 50 is open not to provide the electric signal when the additional operating member 46 is returned to the second rest position P21.

Figure 13:
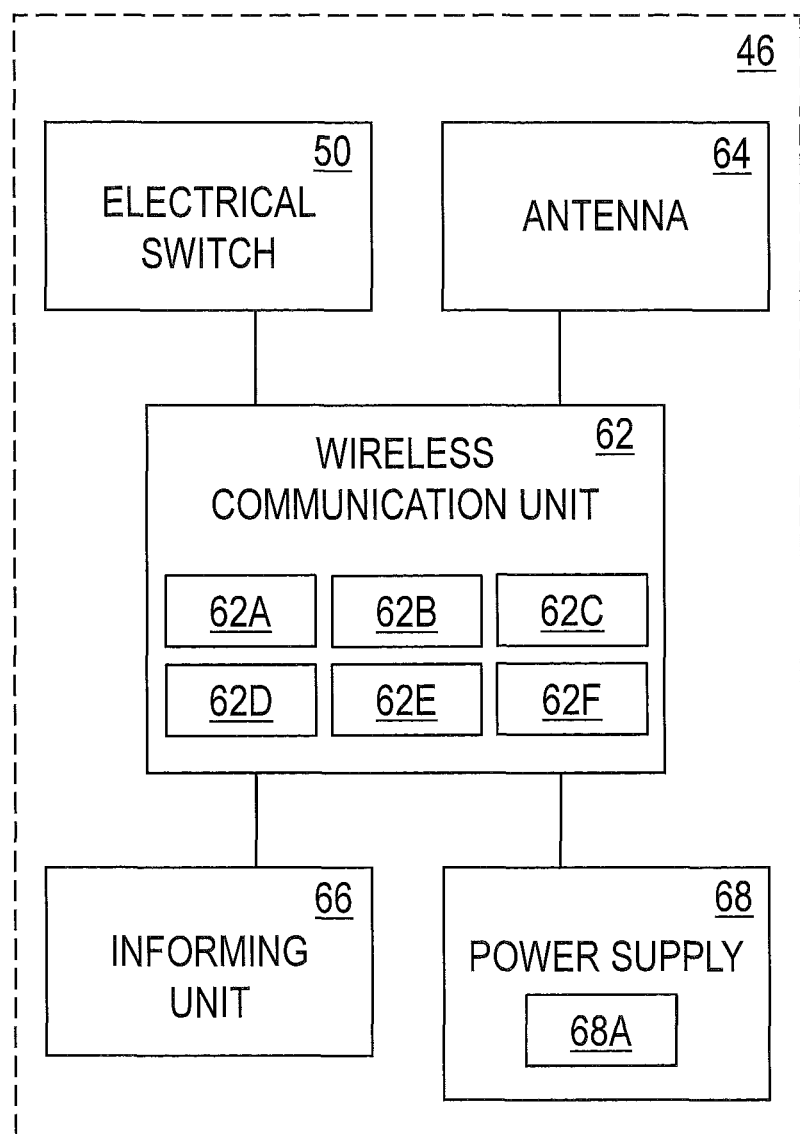
FIG. 13 is a schematic block diagram of the bicycle operating device illustrated in FIG. 1.

As seen in FIGS. 12 and 13, the bicycle operating device 10 further comprises a wireless communication unit 62 connected to the electrical switch 50 to transmit a wireless signal based on an input from the electrical switch 50. The wireless communication unit 62 is disposed at one of the base member 12, the operating member 14, and the additional operating member 46. In this embodiment, the wireless communication unit 62 is disposed at the additional operating member 46. However, the wireless communication unit 62 can be disposed at one of the base member 12 and the operating member 14.

As seen in FIG. 12, the wireless communication unit 62 is attached to the operating member 14. In this embodiment, the wireless communication unit 62 is integrally provided with the electrical switch 50 as a single unit. The bicycle operating device 10 comprises an electronic substrate 63. The electrical switch 50 and the wireless communication unit 62 are mounted on the electronic substrate 63 and electrically connected to each other via the electronic substrate 63. The electronic substrate 63 is secured to the additional operating member 46 (e.g., the attachment part 54). The bicycle operating device 10 comprises an antenna 64 connected to the wireless communication unit 62. The antenna 64 is mounted on the electronic substrate 63. The wireless communication unit 62, the electronic substrate 63, and the antenna 64 are disposed in the accommodation space 54C of the attachment part 54. The wireless communication unit 62 wirelessly transmits the wireless signal based on the electric signal via the antenna 64. The antenna 64 can be included in the wireless communication unit 62 or can be integrally provided with the wireless communication unit 62 as a single module or unit.

In this embodiment, as seen in FIG. 13, the wireless communication unit 62 includes a processor 62A, a memory 62B, a signal generating circuit 62C, a signal transmitting circuit 62D, and a signal receiving circuit 62E. Thus, the wireless communication unit 62 can also be referred to as a wireless communication circuit 62 in the present application. The processor 62A includes a central processing unit (CPU) and a memory controller. The memory 62B is connected to the processor 62A. The memory 62B includes a read only memory (ROM) and a random access memory (RAM). The ROM includes a non-transitory computer-readable storage medium. The RAM includes a transitory computer-readable storage medium. The memory 62B includes storage areas each having an address in the ROM and the RAM. The processor 62A controls the memory 62B to store data in the storage areas of the memory 62B and reads data from the storage areas of the memory 62B. The memory 62B (e.g., the ROM) stores a program. The program is read into the processor 62A, and thereby functions of the wireless communication unit 62 (e.g., at least part of functions of the signal generating circuit 62C and the signal transmitting circuit 62D).

The signal generating circuit 62C generates wireless signals based on the electric signal input from the electrical switch 50. The signal generating circuit 62C superimposes digital signals on carrier wave using a predetermined wireless communication protocol to generate the wireless signals. The signal transmitting circuit 62D transmits the wireless signal via the antenna 64 in response to the electric signal input from the electrical switch 50. In this embodiment, the signal generating circuit 62C can encrypt control information (e.g., shift information) to generate encrypted wireless signals. The signal generating circuit 62C encrypts digital signals stored in the memory 62B using a cryptographic key. The signal transmitting circuit 62D transmits the encrypted wireless signals. Thus, the wireless communication unit 62 wirelessly transmits the wireless signal to upshift or downshift the electric shifting device BC2 when the electrical switch 50 is closed to provide the electric signal.

Further, the signal receiving circuit 62E receives a wireless signal from the electric shifting device BC2 via the antenna 64. In this embodiment, the signal receiving circuit 62E decodes the wireless signal to recognize information wirelessly transmitted from the electric shifting device BC2. The signal receiving circuit 62E may decrypt the encrypted wireless signal using the cryptographic key. Namely, the wireless communication unit 62 is configured to transmit a wireless signal to control other electrical bicycle components and to receive a wireless signal to recognize information from other electrical bicycle components. In other words, the wireless communication unit 62 is provided as a wireless transmitter and a wireless receiver. The other electrical bicycle components can include the electric suspension and the electric seatpost in addition to the electric shifting device BC2. In this embodiment, the wireless communication unit 62 is integrally provided as a single module or unit. However, the wireless communication unit 62 can be constituted of a wireless transmitter and a wireless receiver which are provided as separate modules or units arranged at different positions from each other. The signal receiving circuit 62E can be omitted from the wireless communication unit 62.

As seen in FIGS. 12 and 13, the bicycle operating device 10 further comprises an informing unit 66. The informing unit 66 is connected to the wireless communication unit 62 to inform a user of a status of the wireless communication unit 62. The informing unit 66 is disposed on at least one of the base member 12, the operating member 14, and the additional operating member 46. In this embodiment, as seen in FIG. 12, the informing unit 66 is disposed on the operating member 14. However, the informing unit 66 can be disposed on at least one of the base member 12 and the additional operating member 46 instead of or in addition to on the operating member 14. Examples of the status of the wireless communication unit 62 include a signal transmission status and a power supply status.

As seen in FIG. 12, the informing unit 66 is mounted on the electronic substrate 63. The informing unit 66 is disposed in the accommodation space 54C of the attachment part 54. The informing unit 66 is electrically connected to the wireless communication unit 62 via the electronic substrate 63. The informing unit 66 includes a light emitting element such as a light emitting diode (LED). However, the informing unit 66 can include other elements such as a buzzer instead of or in addition to the light emitting element. Light from the informing unit 66 is visible from outside of the bicycle operating device 10 via a clear window 67.

As seen in FIGS. 12 and 13, the bicycle operating device 10 further comprises a power supply 68 connected to at least one of the electrical switch 50 and the wireless communication unit 62. The power supply 68 is disposed on at least one of the base member 12, the operating member 14, and the additional operating member 46. In this embodiment, as seen in FIG. 13, the power supply 68 is electrically connected to the wireless communication unit 62 to supply electric energy (e.g., a power source voltage) to the wireless communication unit 62. The power supply 68 supplies the electric energy to other elements via the wireless communication unit 62. However, the power supply 68 can be electrically connected to the other elements without via the wireless communication unit 62. As seen in FIG. 12, the power supply 68 is disposed on the additional operating member 46. However, the power supply 68 can be disposed on at least one of the base member 12 and the operating member 14 instead of or in addition to on additional operating member 46. The power supply 68 is disposed in the accommodation space 54C of the attachment part 54.

In this embodiment, the power supply 68 includes a battery 68A. The battery 68A is held in a battery holder 70 arranged in the accommodation space 54C of the attachment part 54. Examples of the battery 68A include a primary battery such as a lithium manganese dioxide battery, and a secondary battery such as a lithium-ion secondary battery. In this embodiment, the battery 68A is a primary button battery.

As seen in FIG. 13, the wireless communication unit 62 includes a voltage regulator 62F. The voltage regulator 62F regulates the power source voltage to a level at which various circuits of the wireless communication unit 62 and the informing unit 66 can properly operate. The voltage regulator 62F supplies the regulated voltage to the processor 62A, the memory 62B, the signal generating circuit 62C, the signal transmitting circuit 62D, the signal receiving circuit 62E, and the informing unit 66. The voltage regulator 62F can be provided in the power supply 68.

The bicycle operating device 10 has the following features.

(1) The base member 12 includes the hydraulic-unit attachment part 20 to which the hydraulic unit 22 is to be attached. The operating member 14 is movably coupled to the base member 12. The operating member 14 includes the first wire attachment part 26 to which the first wire end 28A of the control wire 28 is to be attached. The first wire attachment part 26 allows the user to operate the wire-actuated bicycle component BC3 via the control wire 28. Furthermore, it is possible to attach the hydraulic unit 22 to the base member 12 via the hydraulic-unit attachment part 20. This allows the user to utilize the bicycle operating device 10 to operate one of the hydraulic bicycle component BC1 and the wire-actuated bicycle component BC3. Thus, it is possible to commonalize the bicycle operating device 10 for the hydraulic bicycle component BC1 and the wire-actuated bicycle component BC3, reducing manufacturing cost of the bicycle operating device 10.

(2) The hydraulic unit 22 is operatively coupled to the operating member 14 to generate the hydraulic pressure in response to the movement of the operating member 14. The hydraulic unit 22 is attached to the hydraulic-unit attachment part 20. Accordingly, it is possible to operate the hydraulic bicycle component BC1 by using the hydraulic unit 22 attached to the hydraulic-unit attachment part 20.

(3) The control wire 28 couples the operating member 14 to the hydraulic unit 22 to transmit the movement of the operating member 14 to the hydraulic unit 22. The first wire end 28A of the control wire 28 is attached to the first wire attachment part 26. Accordingly, it is possible to operate the hydraulic unit 22 via a simple structure such as the control wire 28.

(4) The control wire 28 includes the first wire end 28A and the second wire end 28B opposite to the first wire end 28A. The second wire end 28B is attached to the second wire attachment part 30. Accordingly, it is possible to certainly operate the hydraulic unit 22 via a simple structure such as the control wire 28.

(5) The second wire attachment part 30 is operatively coupled to the piston 34 to transmit the movement of the operating member 14 to the piston 34 via the control wire 28. Accordingly, it is possible to move the piston 34 relative to the hydraulic cylinder 32 in response to the movement of the operating member 14.

(6) The second wire attachment part 30 is pivotally coupled to the hydraulic cylinder 32 about the cable pivot axis A3. Accordingly, it is possible to reduce load applied to the hydraulic cylinder 32 via the second wire attachment part 30 compared with a case where the second wire attachment part 30 is secured to the hydraulic cylinder 32.

(7) The operating member 14 is pivotable relative to the base member 12 about the operating pivot axis A1. The cable pivot axis A3 is parallel to the operating pivot axis A1. Accordingly, it is possible to easily transmit the movement of the operating member 14 to the piston 34.

(8) The second wire end 28B of the control wire 28 is coupled to the attachment base 42 with the fastener 44. Accordingly, it is possible to detachably attach the second wire end 28B of the control wire 28 to the second wire attachment part 30.

(9) The attachment base 42 is pivotally coupled to the hydraulic cylinder 32 about the cable pivot axis A3. Accordingly, it is possible to move the piston 34 relative to the hydraulic cylinder 32 in response to the movement of the operating member 14.

(10) The attachment base 42 includes the threaded hole 42A. The fastener 44 includes the externally threaded portion 44A threadedly engaged with the threaded hole 42A. Accordingly, it is possible to detachably attach the second wire end 28B of the control wire 28 to the second wire attachment part 30 of the hydraulic unit 22 via a simple structure.

(11) The fastener 44 includes the head portion 44B provided at the end of the externally threaded portion 44A. The head portion 44B has a first outer diameter DM1. The externally threaded portion 44A has the second outer diameter DM2. The first outer diameter DM1 is larger than the second outer diameter DM2. Accordingly, it is possible to detachably attach the second wire end 28B of the control wire 28 to the second wire attachment part 30 of the hydraulic unit 22 via a simple structure.

(12) The second wire attachment part 30 is farther from the operating member 14 than at least one of the hydraulic cylinder 32 and the piston 34. Accordingly, it is possible to utilize a space disposed on an opposite side of the operating member 14 relative to the at least one of the hydraulic cylinder 32 and the piston 34 for the second wire attachment part 30.

(13) The hydraulic cylinder 32 is a separate member from the base member 12 and is detachably attached to the hydraulic-unit attachment part 20. Accordingly, it is possible to detach the hydraulic unit 22 from the base member 12 when the hydraulic unit 22 is not necessary. This saves weight of the bicycle operating device 10.

(15) The base member 12 includes the internal space 24 in which the hydraulic unit 22 is to be disposed. Accordingly, it is possible to utilize the internal space 24 of the base member 12 as a space to arrange the hydraulic unit 22.

(16) The hydraulic-unit attachment part 20 is disposed in the internal space 24. Accordingly, it is possible to utilize the internal space 24 of the base member 12 as a space for the hydraulic-unit attachment part 20.

(17) The operating member 14 is movably coupled to the second end portion 12B. Accordingly, it is possible to provide a distance between the operating member 14 and the handlebar H. This allows the user to easily operate the operating member 14 in a mounting state where the bicycle operating device 10 is mounted to the handlebar H.

(18) The hydraulic-unit attachment part 20 is closer to the first end portion 12A than the operating member 14. Accordingly, it is possible to utilize a space between the operating member 14 and the first end portion 12A to arrange the hydraulic-unit attachment part 20.

(19) The hydraulic-unit attachment part 20 is disposed between the first end portion 12A and the second end portion 12B. Accordingly, it is possible to utilize a space between the first end portion 12A and the second end portion 12B to arrange the hydraulic-unit attachment part 20.

(20) The bicycle operating device 10 further comprises the electrical switch 50 mounted to the operating member 14. Accordingly, it is possible to operate the electrical bicycle component BC2 via the electrical switch 50 in addition to one of the hydraulic bicycle component BC1 and the wire-actuated bicycle component BC3.

(22) The bicycle operating device 10 further comprises the additional operating member 14 movably coupled to the operating member 14 to operate the electrical switch 50. Accordingly, it is possible to easily operate the electrical switch 50 via the additional operating member 14.

(23) The bicycle operating device 10 further comprises the wireless communication unit 62 connected to the electrical switch 50 to transmit a wireless signal based on an input from the electrical switch 50. Accordingly, it is possible to operate the electrical bicycle component BC2 via wireless communication.

Second Embodiment

A bicycle operating device 210 in accordance with a second embodiment will be described below referring to FIGS. 14 and 15. The bicycle operating device 210 has the same structure and/or configuration as those of the bicycle operating device 10 except for the wireless communication unit 62. Thus, elements having substantially the same function as those in the first embodiment will be numbered the same here, and will not be described and/or illustrated again in detail here for the sake of brevity.

Figure 14:
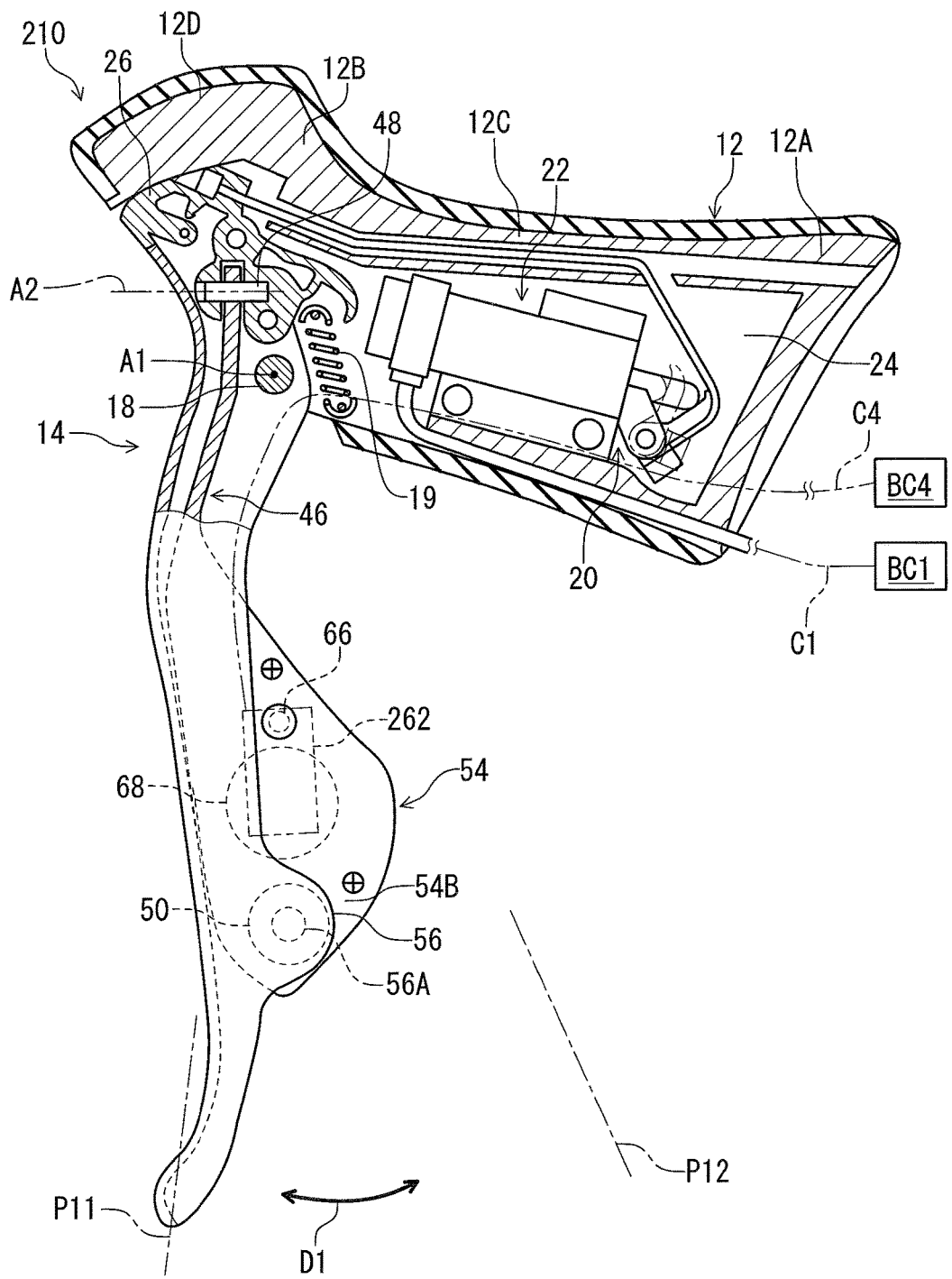
FIG. 14 is a left side elevational view of a bicycle operating device in accordance with a second embodiment.

As seen in FIG. 14, the bicycle operating device 210 comprises the base member 12 and the operating member 14. Unlike the bicycle operating device 10 of the first embodiment, the wireless communication unit 62 and the antenna 64 are omitted from the bicycle operating device 210. Instead, as seen in FIG. 15, the bicycle operating device 210 further comprises a signal controller 262 connected to the electrical switch 50 to transmit a control signal via an electrical control cable C4 based on an input from the electrical switch 50. The bicycle operating device 210 is operatively connected to an electrical bicycle component BC4 via the electrical control cable C4.

In this embodiment, the signal controller 262 transmit the control signal by using power line communication (PLC) technology. The power line communication technology is used for communicating between electrical components. Power line communication (PLC) carries data on a conductor that is also used simultaneously for electric power transmission or electric power distribution to the electrical component. Since the PLC has been known in the bicycle field, it will not be described in detail here for the sake of brevity.

Figure 15:
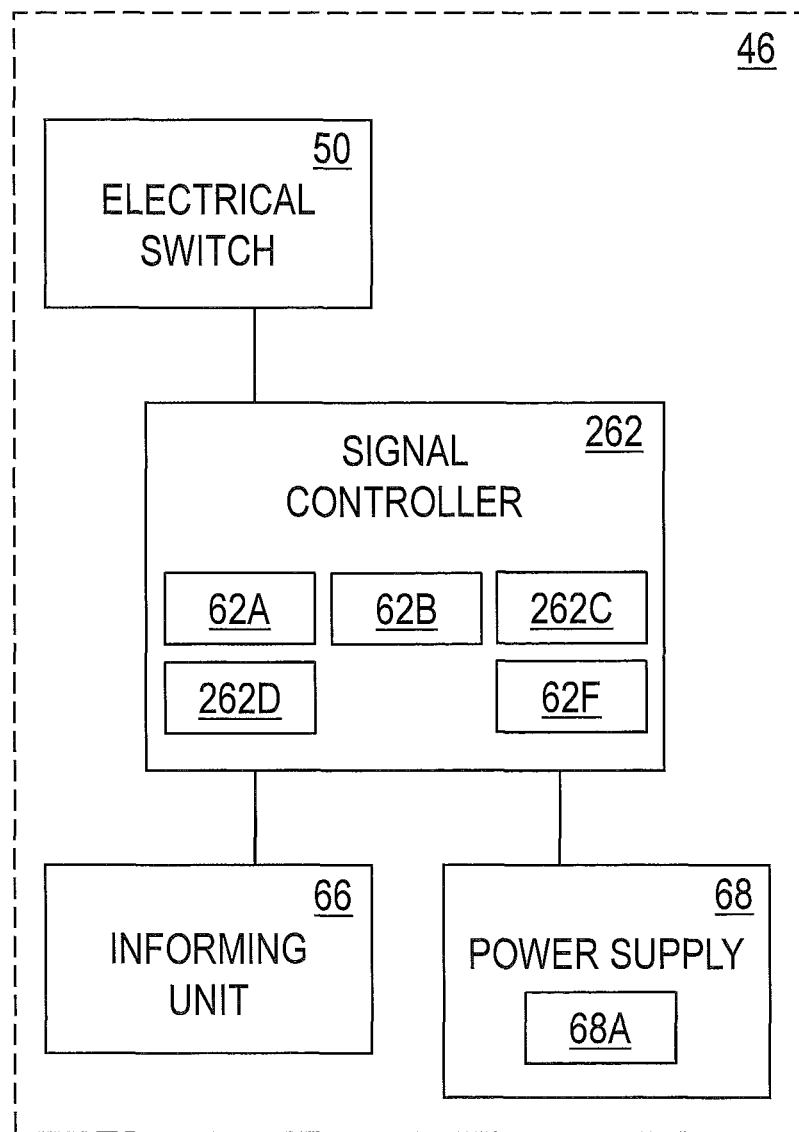
FIG. 15 is a schematic block diagram of the bicycle operating device illustrated in FIG. 14.

As seen in FIG. 15, the signal controller 262 includes the processor 62A, the memory 62B, a signal generating circuit 262C, a PLC controller 262D, and the voltage regulator 62F. The signal generating circuit 262C generates the control signal based on the electric signal from the electrical switch 50. The PLC controller 262D superimposes the control signal on the power source voltage applied to the electrical control cable C4.

With the bicycle operating device 210, it is possible to obtain substantially the same effects as those of the bicycle operating device 10 of the first embodiment.

Furthermore, the bicycle operating device 210 further comprises the signal controller 262 connected to the electrical switch 50 to transmit the control signal via the electrical control cable C4 based on the input from the electrical switch 50. Accordingly, it is possible to operate the electrical bicycle component BC2 via the electrical control cable C4.

Third Embodiment

A bicycle operating device 310 in accordance with a third embodiment will be described below referring to FIG. 16. The bicycle operating device 310 has the same structure and/or configuration as those of the bicycle operating device 10 except for the arrangement of some elements. Thus, elements having substantially the same function as those in the first embodiment will be numbered the same here, and will not be described and/or illustrated again in detail here for the sake of brevity.

Figure 16:
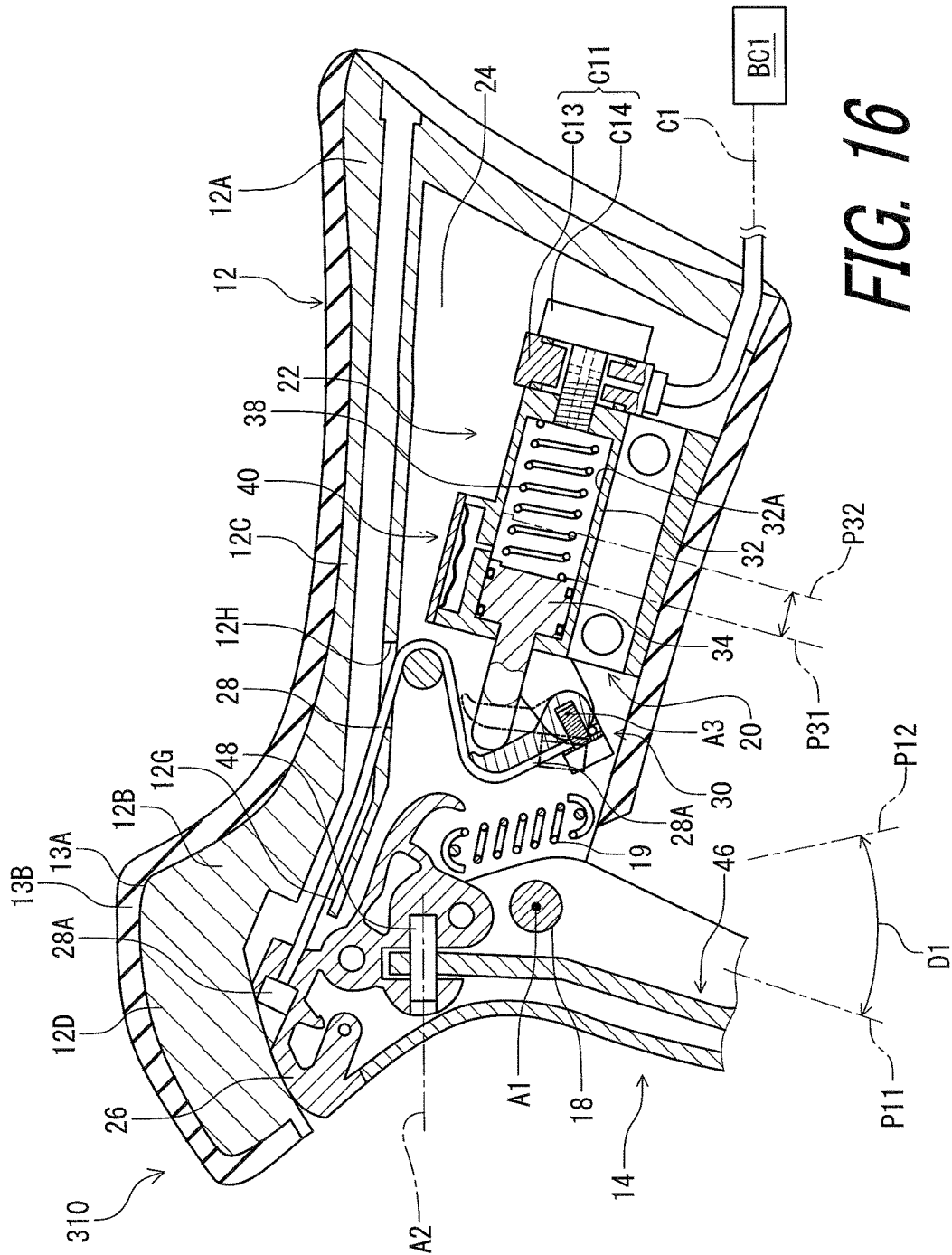
FIG. 16 is a partial cross-sectional view of a bicycle operating device in accordance with a third embodiment.

As seen in FIG. 16, in the bicycle operating device 310, the second wire attachment part 30 is closer to the operating member 14 than at least one of the hydraulic cylinder 32 and the piston 34. In this embodiment, the second wire attachment part 30 is closer to the operating member 14 than the hydraulic cylinder 32 and the piston 34. However, the second wire attachment part 30 can be closer to the operating member 14 than one of the hydraulic cylinder 32 and the piston 34. The piston 34 moves relative to the hydraulic cylinder 32 toward the first end portion 12A of the base member 12 when the operating member 14 is pivoted relative to the base member 12 from the first rest position P11 toward the first operated position P12.

With the bicycle operating device 310, it is possible to obtain substantially the same effects as those of the bicycle operating device 10 of the first embodiment.

Furthermore, the second wire attachment part 30 is closer to the operating member 14 than at least one of the hydraulic cylinder 32 and the piston 34. Accordingly, it is possible to utilize a space disposed between the operating member 14 and the at least one of the hydraulic cylinder 32 and the piston 34 for the second wire attachment part 30.

Fourth Embodiment

A bicycle operating device 410 in accordance with a fourth embodiment will be described below referring to FIG. 17. The bicycle operating device 410 has the same structure and/or configuration as those of the bicycle operating device 10 except for the arrangement of some elements. Thus, elements having substantially the same function as those in the first embodiment will be numbered the same here, and will not be described and/or illustrated again in detail here for the sake of brevity.

Figure 17:
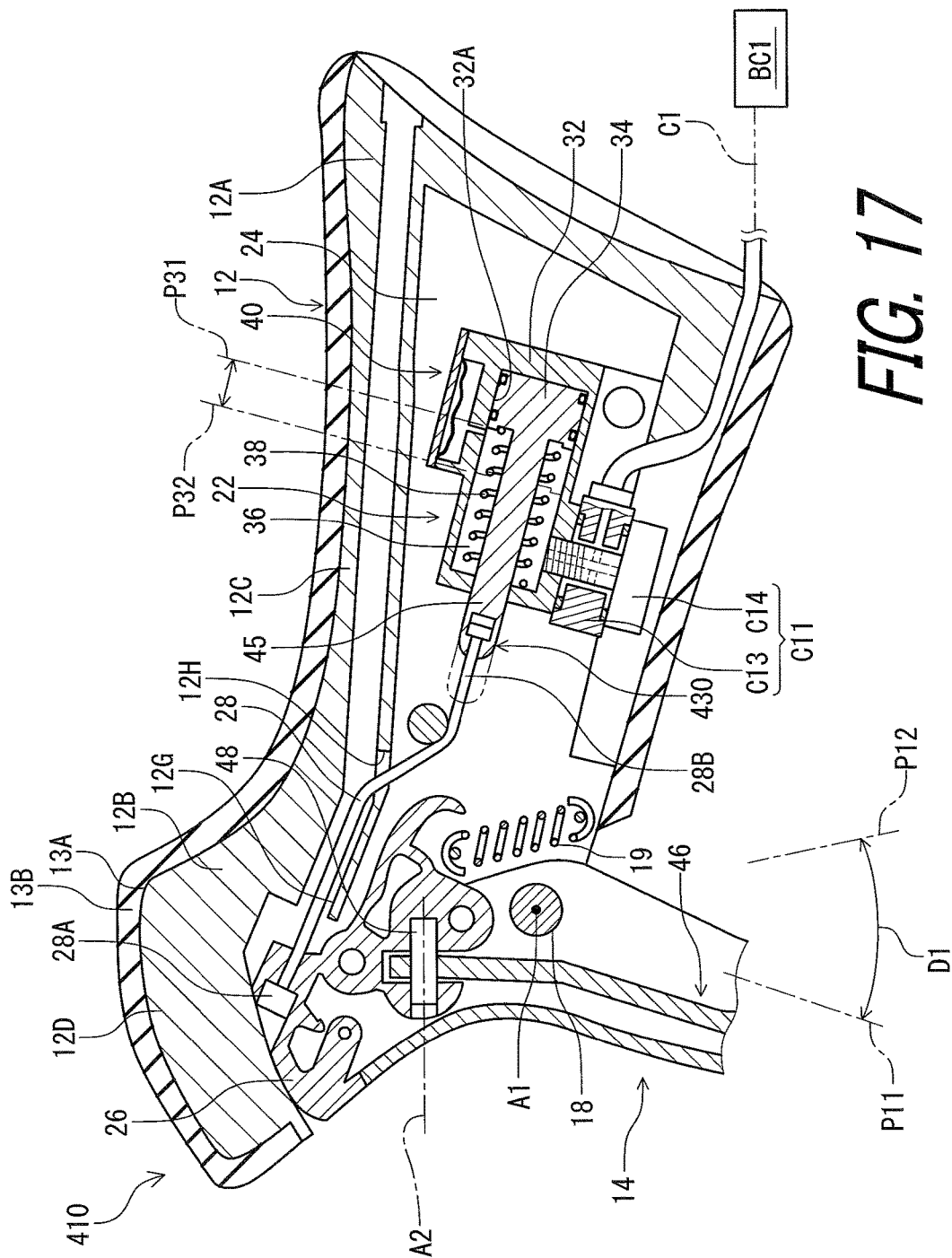
FIG. 17 is a partial cross-sectional view of a bicycle operating device in accordance with a fourth embodiment.

As seen in FIG. 17, in the bicycle operating device 410, the hydraulic unit 22 includes a second wire attachment part 430. The second wire end 28B is attached to the second wire attachment part 430. The second wire attachment part 430 is provided at an end of the piston rod 45. The second wire attachment part 430 is closer to the operating member 14 than at least one of the hydraulic cylinder 32 and the piston 34. In this embodiment, the second wire attachment part 430 is closer to the operating member 14 than the hydraulic cylinder 32 and the piston 34. However, the second wire attachment part 430 can be closer to the operating member 14 than one of the hydraulic cylinder 32 and the piston 34.

The piston 34 moves relative to the hydraulic cylinder 32 toward the second end portion 12B of the base member 12 when the operating member 14 is pivoted relative to the base member 12 from the first rest position P11 toward the first operated position P12.

With the bicycle operating device 410, it is possible to obtain substantially the same effects as those of the bicycle operating device 10 of the first embodiment.

Furthermore, the second wire attachment part 430 is closer to the operating member 14 than at least one of the hydraulic cylinder 32 and the piston 34. Accordingly, it is possible to utilize a space disposed between the operating member 14 and the at least one of the hydraulic cylinder 32 and the piston 34 for the second wire attachment part 430.

Fifth Embodiment

A bicycle operating device 510 in accordance with a fifth embodiment will be described below referring to FIG. 18. The bicycle operating device 510 has the same structure and/or configuration as those of the bicycle operating device 10 except for the arrangement of some elements. Thus, elements having substantially the same function as those in the first embodiment will be numbered the same here, and will not be described and/or illustrated again in detail here for the sake of brevity.

Figure 18:
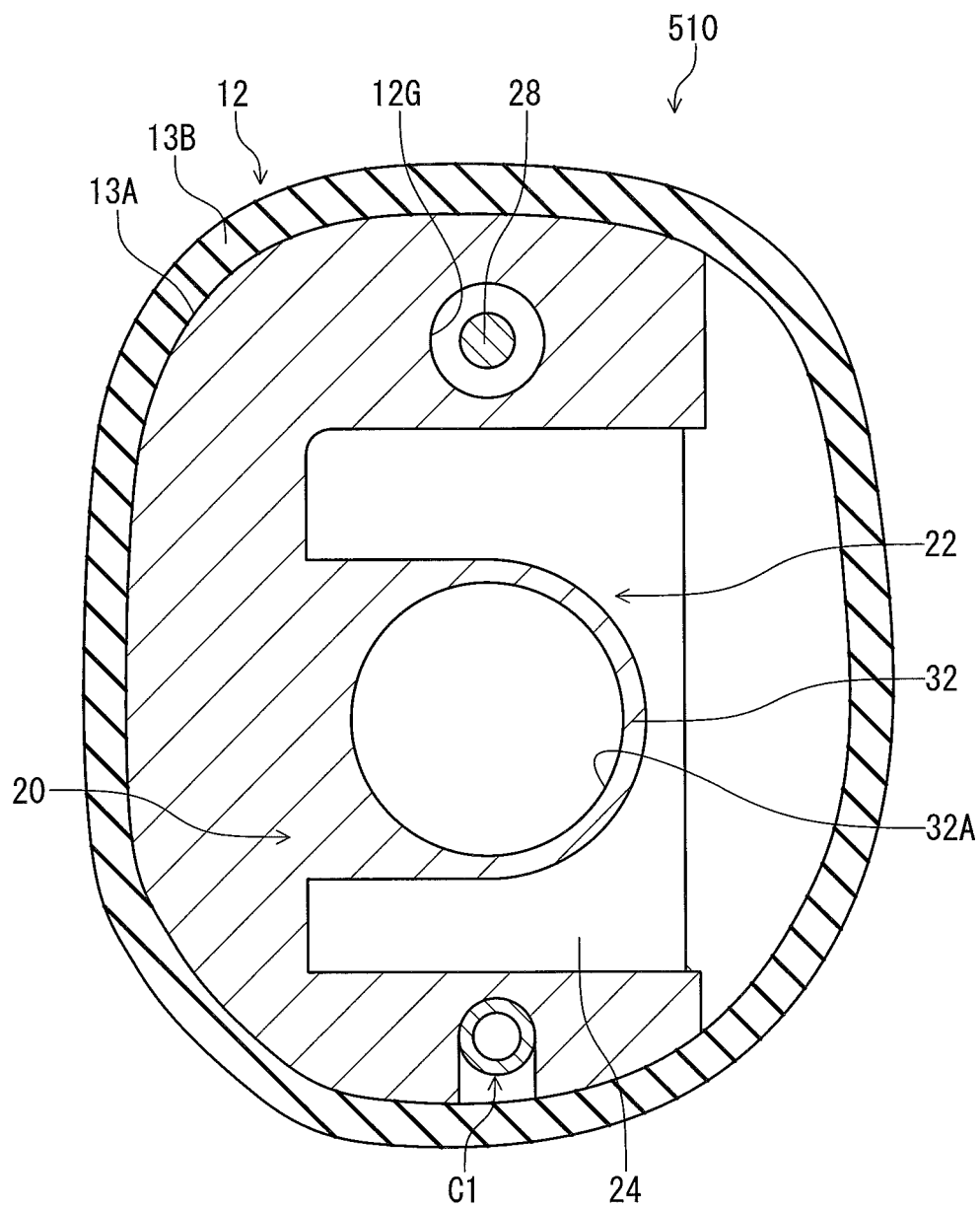
FIG. 18 is a cross-sectional view of a bicycle operating device in accordance with a fifth embodiment.

As seen in FIG. 18, in the bicycle operating device 510, the hydraulic cylinder 32 is integrally provided with the base member 12 as a one-piece unitary member. Specifically, the hydraulic cylinder 32 is integrally provided with the base body 13A as a one-piece unitary member. In this embodiment, the hydraulic-unit attachment part 20 is disposed at a coupling portion at which the hydraulic cylinder 32 is integrally coupled to the base body 13A of the base member 12.

With the bicycle operating device 510, it is possible to obtain substantially the same effects as those of the bicycle operating device 10 of the first embodiment.

Furthermore, the hydraulic cylinder 32 is integrally provided with the base member 12 as a one-piece unitary member. Accordingly, it is possible to easily ensure necessary strength of the bicycle operating device 510.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified tem' such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member including
      a hydraulic-unit attachment part to which a hydraulic unit is to be attached, and
      a first end portion to be mounted to a handlebar;
   an operating member movably coupled to the base member; and
   a control wire, wherein
   the operating member includes a first wire attachment part to which a first wire end of the control wire is attached, and
   the control wire couples the operating member to the hydraulic unit to transmit the movement of the operating member to the hydraulic unit.

2. The bicycle operating device according to claim 1, further comprising:
   the hydraulic unit operatively coupled to the operating member to generate a hydraulic pressure in response to a movement of the operating member, wherein
   the hydraulic unit is attached to the hydraulic-unit attachment part.

3. The bicycle operating device according to claim 1, wherein
   the base member includes an internal space in which the hydraulic unit is to be disposed.

4. The bicycle operating device according to claim 3, wherein
   the hydraulic-unit attachment part is disposed in the internal space.

5. The bicycle operating device according to claim 1, wherein
   the base member includes a second end portion opposite to the first end portion, and
   the operating member is movably coupled to the second end portion.

6. The bicycle operating device according to claim 5, wherein
   the hydraulic-unit attachment part is closer to the first end portion than the operating member.

7. The bicycle operating device according to claim 5, wherein
   the hydraulic-unit attachment part is disposed between the first end portion and the second end portion.

8. The bicycle operating device according to claim 1, further comprising:
   an electrical switch mounted to the operating member.

9. The bicycle operating device according to claim 8, further comprising:
   an additional operating member movably coupled to the operating member to operate the electrical switch.

10. The bicycle operating device according to claim 8, further comprising:
    a wireless communication unit connected to the electrical switch to transmit a wireless signal based on an input from the electrical switch.

11. The bicycle operating device according to claim 8, further comprising:

a signal controller connected to the electrical switch to transmit a control signal via an electrical control cable based on an input from the electrical switch.

12. The bicycle operating device according to claim 1, wherein
the control wire couples the operating member to the hydraulic unit to mechanically transmit the movement of the operating member to the hydraulic unit.

13. A bicycle operating device comprising:
a base member including
a hydraulic-unit attachment part to which a hydraulic unit is to be attached, and
a first end portion to be mounted to a handlebar; and
an operating member movably coupled to the base member, the operating member including a first wire attachment part to which a first wire end of a control wire is to be attached,
the hydraulic unit operatively coupled to the operating member to generate a hydraulic pressure in response to a movement of the operating member, wherein
the hydraulic unit is attached to the hydraulic-unit attachment part, and
the control wire coupling the operating member to the hydraulic unit to transmit the movement of the operating member to the hydraulic unit, wherein
the first wire end of the control wire is attached to the first wire attachment part.

14. The bicycle operating device according to claim 13, wherein
the hydraulic unit includes a second wire attachment part,
the control wire includes the first wire end and a second wire end opposite to the first wire end, and
the second wire end is attached to the second wire attachment part.

15. The bicycle operating device according to claim 14, wherein
the hydraulic unit includes
a hydraulic cylinder including a cylinder bore, and
a piston movably provided in the cylinder bore, and
the second wire attachment part is operatively coupled to the piston to transmit the movement of the operating member to the piston via the control wire.

16. The bicycle operating device according to claim 15, wherein
the second wire attachment part is pivotally coupled to the hydraulic cylinder about a cable pivot axis.

17. The bicycle operating device according to claim 16, wherein
the operating member is pivotable relative to the base member about an operating pivot axis, and
the cable pivot axis is parallel to the operating pivot axis.

18. The bicycle operating device according to claim 15, wherein
the second wire attachment part is farther from the operating member than at least one of the hydraulic cylinder and the piston.

19. The bicycle operating device according to claim 15, wherein
the second wire attachment part is closer to the operating member than at least one of the hydraulic cylinder and the piston.

20. The bicycle operating device according to claim 15, wherein
the hydraulic cylinder is a separate member from the base member and is detachably attached to the hydraulic-unit attachment part.

21. The bicycle operating device according to claim 15, wherein
the hydraulic cylinder is integrally provided with the base member as a one-piece unitary member.

22. The bicycle operating device according to claim 14, wherein
the second wire attachment part includes an attachment base and a fastener coupled to the attachment base, and
the second wire end of the control wire is coupled to the attachment base with the fastener.

23. The bicycle operating device according to claim 22, wherein
the hydraulic unit includes
a hydraulic cylinder including a cylinder bore, and
a piston movably provided in the cylinder bore, and
the attachment base is pivotally coupled to the hydraulic cylinder about a cable pivot axis.

24. The bicycle operating device according to claim 22, wherein
the attachment base includes a threaded hole, and
the fastener includes an externally threaded portion threadedly engaged with the threaded hole.

25. The bicycle operating device according to claim 24, wherein
the fastener includes a head portion provided at an end of the externally threaded portion,
the head portion has a first outer diameter,
the externally threaded portion has a second outer diameter, and
the first outer diameter is larger than the second outer diameter.

26. A bicycle operating device comprising:
a base member including
a hydraulic-unit attachment part to which a hydraulic unit is to be attached, and
a first end portion to be mounted to a handlebar; and
an operating member movably coupled to the base member, the operating member including a first wire attachment part to which a first wire end of a control wire is to be attached,
the operating member including a first end and a second end that is opposite to the first end, the second end is farther from the base member than the first end, and
the first wire attachment part is provided on the first end of the operating member.

* * * * *